US 6,737,466 B2

(12) United States Patent
Schaal et al.

(10) Patent No.: US 6,737,466 B2
(45) Date of Patent: May 18, 2004

(54) SILICA REINFORCED RUBBER COMPOSITIONS OF IMPROVED PROCESSABILITY AND STORAGE STABILITY

(75) Inventors: Stephane Schaal, Lipsheim (FR); Aubert Y. Coran, Akron, OH (US); Syed K. Mowdood, Hudson, OH (US)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/235,920

(22) Filed: Sep. 6, 2002

(65) Prior Publication Data

US 2003/0158317 A1 Aug. 21, 2003

Related U.S. Application Data

(60) Division of application No. 09/571,503, filed on May 15, 2000, now Pat. No. 6,482,884, which is a continuation-in-part of application No. 09/514,461, filed on Feb. 28, 2000.

(51) Int. Cl.⁷ .............................. C08K 6/36; C08K 9/06
(52) U.S. Cl. ....................... 524/492; 524/571; 524/572; 524/575; 524/856
(58) Field of Search .................... 524/492, 571, 524/572, 575, 856

(56) References Cited

U.S. PATENT DOCUMENTS

| | | |
|---|---|---|
| 3,873,489 A | 3/1975 | Thurn et al. |
| 4,229,333 A | 10/1980 | Wolff et al. |
| 4,357,432 A | 11/1982 | Edwards |
| 4,519,430 A | 5/1985 | Ahmad et al. |
| 5,021,522 A | 6/1991 | Durairaj et al. |
| 5,049,641 A | 9/1991 | Hood et al. |
| 5,063,268 A | 11/1991 | Young |
| 5,162,409 A | 11/1992 | Mroczkowski |
| 5,219,944 A | 6/1993 | Scriver et al. |
| 5,227,425 A | 7/1993 | Rauline |
| 5,396,940 A | 3/1995 | Segatta et al. |
| 5,489,628 A | 2/1996 | Sandstrom |
| 5,504,137 A | 4/1996 | Sandstrom et al. |
| 5,665,812 A | 9/1997 | Gorce et al. |
| 5,885,389 A | 3/1999 | Sandstrom et al. |
| 5,886,086 A | 3/1999 | Hubbell et al. |
| 5,905,112 A | 5/1999 | Hellermann |
| 5,945,500 A | 8/1999 | Durairaj et al. |

FOREIGN PATENT DOCUMENTS

| | | | |
|---|---|---|---|
| BR | 9101132 | 11/1991 | |
| DE | 2816066 | 10/1978 | |
| DE | 197 00 967 A1 | 7/1998 | |
| DE | 100 31 348 A1 | 1/2001 | ........... C08C/19/30 |
| EP | 91-401188 | 5/1991 | |
| EP | 94-114012 | 9/1994 | |
| EP | 94-890181 | 10/1994 | |
| EP | 95-106428 | 4/1995 | |
| EP | 763564 A2 | 3/1997 | |
| EP | 0 780 429 A1 | 6/1997 | |
| EP | 0 825 224 A1 * | 2/1998 | |
| EP | 0 890 603 A1 | 1/1999 | |
| EP | 890 606 A1 | 1/1999 | |
| JP | 92-234836 | 9/1952 | |
| JP | 57137333 A2 | 8/1982 | |
| JP | 61287802 A2 | 12/1986 | |
| JP | 61287945 A2 | 12/1986 | |
| JP | 93-233755 | 9/1993 | |
| JP | 94-110271 | 4/1994 | |
| JP | 07082417 A2 | 3/1995 | |
| JP | 96-80461 | 3/1996 | |
| JP | 96-119689 | 4/1996 | |
| JP | 10001564 A2 | 1/1998 | |
| RO | 93933 B1 | 5/1988 | |
| RU | 1454817 A1 | 1/1989 | |

OTHER PUBLICATIONS

Ibara et al., Preliminary Study on the Effect of *Epoxy* Compounds on the Properties of *Silica*–filled SBR Vulcanizates. 2. Chemically Bonded reactants. Rev. Plast. Mod. (1984), 47(336), 645–50. (Written in Spanish.) (Eng. Abs).
Ibara et al., Preliminary Study on the Effect of *Epoxy* Compounds on the Properties of Silica–filled SBR vulcanizates. Rev. Plast. Mod. (1984), 47(334), 389–93, 404 (Eng. Abs.).
Wang et al., Properties of silica–reinforced ENR. Xiangjiao Gongye (1995), 42(6), 323–6. (Eng. Abs).
Hashim, et al., "Silica Reinforcement of Epoxidized Natural Rubber by the Sol–gel Method," J. Sol–Gel Sci. Technol (1995), 5(3), 211–18 .(Eng. Abs.).

* cited by examiner

*Primary Examiner*—Robert Deshon Harlan
(74) *Attorney, Agent, or Firm*—Finnegan, Henderson, Farabow, Garrett & Dunner, L.L.P.

(57) ABSTRACT

The disclosure relates to a process for improving the processability, storage stability and/or cure rate of an uncured silica reinforced rubber composition where silica comprises the major filler in the reinforced rubber composition, which comprises combining a mixture comprising, rubber, silica and at least one organic compound having a low molecular weight and a functional group wherein said functional group is at least an epoxy group, such as an epoxy/ether, epoxy/hydroxyl, epoxy/ester, epoxy/amine, ether/amine, episulfide, episulfide/ether, episulfide/hydroxyl, episulfide/ester functional group located in a terminal or sterically unhindered position in the molecule of said organic compound where the molecular weight of said organic compound having a low molecular weight is less than 7,000, or the organic compound comprises an abietyl, styrenated resorcinol formaldehyde, or ester hydroxyl organic compound having a hydroxyl, ester, and optionally, an ether group, such as an ester diol.

14 Claims, 3 Drawing Sheets

SILICA REINFORCED RUBBER COMPOSITIONS OF IMPROVED PROCESSABILITY AND STORAGE STABILITY

This is a division of application Ser. No. 09/571,503, filed May 15, 2000 now U.S. Pat. No. 6,482,884, which has been allowed, which is a continuation-in-part of application Ser. No. 09/514,461 filed Feb. 28, 2000, both of which are incorporated herein by reference.

FIELD OF THE INVENTION

The invention relates to silica reinforced rubber compositions of matter having improved processability, storage stability and or cure for use in tires and mechanical goods.

BACKGROUND OF THE INVENTION

Particulate fillers such as silica, carbon black, clays, talc, calcium carbonate, silicates (Science and Technology of Rubber, edited by J. E. Mark et al., Academic Press Inc., San Diego, Calif., 1994 p 387–469) and starch (F. G. Corvasce et al., U.S. Pat. No. 5,672,639) have been generally used as reinforcing materials for rubbers to improve their physical properties such as modulus, tensile strength, abrasion, tear properties, and dynamic properties.

The reinforcement of elastomers with particulate fillers such as silica and carbon black has been extensively studied. Four major characteristics of the fillers, namely particle size, morphology, aggregate structure and surface activity, influence the physical and mechanical properties of the reinforced rubber compositions. These characteristics contribute to the reinforcement of the elastomers through interactions between elastomers and fillers, occlusion of the elastomer in the internal voids of the aggregate and agglomeration of the filler aggregates in the elastomer matrix (S. Wolff & M. J. Wang in "Carbon Black, Science & Technology," editors: J. B. Donnet, R. C. Bansal & M. J. Wang, Marcel Dekker, Inc., New York 1993). It is known that several types of interactions exist between molecules which are close to one another, e.g., dispersive, dipole-dipole, induced dipole-dipole, hydrogen bonding and the like. Such interactions can result in different types of cohesive forces. The surface energy of a solid, $\gamma_s$, can be expressed as the sum of several components, each corresponding to a specific type of interaction. For most substances: $\gamma_s = \gamma_s^d + \gamma_s^{sp}$ where $\gamma_s^d$ is the dispersive component of the surface free energy and $\gamma_s^{sp}$ (or specific component) is the sum of the other components of the surface free energy. It should be noted that $\gamma_s^{sp}$ comprises polar components, e.g., dipole-dipole, hydrogen bonding, and the like.

The difference in the surface free energy of carbon black and silica results in significant differences in the filler-filler and filler-rubber interaction. Compared to carbon black, surface energies of silica with equivalent surface area and structure, have a low dispersive component and a high specific component (M. J. Wang & S. Wolff, Rubber Chemistry and Technology, 65, 329, 1992). The low dispersive component (related to weaker polymer-filler interaction) has been shown to produce low modulus at high strains (S. Wolff, M. J. Wang & E. H. Tan, American Chemical Society, Rubber Division Meeting, Denver, Colo., May 1993). The higher specific component of the surface free energy of silica results in strong filler-filler interaction, resulting in increased viscosity of the rubber composition, especially at low strain rates.

The surface characteristics and hence the surface energy of silica can be changed by surface modification, for example, when the silica surface is chemically modified with so-called coupling systems such as a polyfunctional organosilane, e.g., bis(3-triethoxysilyl propyl)tetrasulfide (TESPT). The specific component of the surface free energy ($\gamma_s^{sp}$) is significantly reduced, leading to improved interaction between silica and rubber for improved compatibility (M. J. Wang, S. Wolff, Rubber Chemistry and Technology, 65, 715, 1992). A reduction of filler-filler interaction results in better dispersion and reduced viscosity. Compared to reinforcing carbon black, silica retards the cure rate of the filled composition. This retardation in cure rate has been attributed to the adsorption of curatives on the silica surface (M. Fetterman, Rubber Chemistry and Technology, 58, 179, 1985).

The silanol content, the adsorbed water content and the surface area of the silica, also affect the cure time (S. Wolff et al., American Chemical Society, Rubber Division Meeting, Denver, Colo., May 1993; M. P. Wagner, Rubber Chemistry & Technology, 49, 703, 1976). Silica, because of its high specific component of surface energy, has a strong tendency to agglomerate and is difficult to disperse in hydrocarbon rubbers. Polyfunctional organosilanes with sulfur linkages such as TESPT improve interactions of filler (e.g., silica) with a polymer, thereby improving the physical properties of vulcanizates such as abrasion resistance and reduced tan δ at 60° C. The scorch and cure times are also affected (S. Wolff, M. J. Wang, Tyre Technology Conference, Basel 1993, and Wolff et al., U.S. Pat. No. 4,229,333; Thurn et al., U.S. Pat. No. 3,873,489; Wideman et al., European Patent Application No. EP 0780429A1; R. J. Pickwell, Rubber Chemistry and Technology, 56, 94, 1983; K. J. Sollmann et al., Rubber Division Meeting, American Chemical Society, Cincinnati, Ohio, Fall 1972).

Epoxidized natural rubber (ENR) with up to 50 mole percent epoxidation has been used alone and in combination with other diene rubbers such as natural rubber, styrene butadiene rubber, or butadiene rubber at levels higher than 30 phr (parts per one hundred parts of rubber, on a weight basis) with precipitated silica and mixture of silica with carbon black to improve wet skid resistance, but with poor tire tread abrasion and tear properties. The use of epoxidized natural rubber was accompanied by increased viscosity, retardation of cure rate and poor processability on storage ("Natural Rubber Science and Technology," edited by A. D. Roberts, p.359–456, Oxford University Press, UK, 1988; S. Varughese et al., Kautschuk Gummi und Kunststoffe, 43, 871, 1990). ENR, because of the higher mole percent epoxide groups (10–50%), is reinforced by silica even in the absence of coupling systems such as TESPT or γ-mercaptopropyltrimethoxysilane. The addition of a coupling system enhances the cure rate and strength properties of silica-filled ENR (10–50 mole % epoxidation). (M. Nasir et al., European Polymer Journal, 25, 267, 1989; S. Varughese and D. K. Tripathy, Journal of Applied Polymer Science, 44, 1847, 1992). Epoxidized natural rubbers with an epoxy content from 15 to 85 mole percent have been reportedly used in blends with other diene rubbers such as polyisoprene, butadiene, carboxylated nitrile at a 1–15 phr level in silica or silica/carbon black reinforced tread compositions. A synergistic effect of ENR with a carboxylated nitrile was reported to improve vulcanizate properties (Sandstrom, U.S. Pat. No. 5,489,628).

ENR at 5–30 phr was also reportedly used in blends with diene rubber and a coupling system (TESPT) to improve the abrasion and adhesion properties of the vulcanizate. (Segatta et al., U.S. Pat. No. 5,396,940). The addition of glycols, amines or guanidines to rubber compositions containing silica has been reported to counter the retarding effect of silica on the cure rate during vulcanization. Addition of diethylene glycol or triethanolamine in silica-filled rubber reduced the Mooney viscosity and scorch time. The reduction in Mooney viscosity was storage temperature dependant and was not apparently effective at higher storage temperature (M. P. Wagner, Rubber Chemistry and Technology, 49, 703, 1976). Diene rubber compositions with excellent processability and improved dispersibility of silica have been claimed when dicyclohexylamine and diene polymers modified with —COOH, epoxy, amino or hydroxyl group are used in the rubber composition (H. Takamata et al., Japanese Patent No. JP 07292159). Epoxidized soybean and linseed oils have been reported to enhance the adhesion properties of rubber compositions, containing carbon black as major filler and silica as minor filler, with steel cords. No significant effects on viscosity and processability of compositions containing epoxidized soybean and linseed oils were reported with the aforementioned filler blend (Stevens et al., DE 19700967A1, Jul. 16, 1998).

Accordingly, it would be an advantage to provide a process for reducing the cure time and improving the processability of an uncured silica containing rubber composition as well as providing an uncured rubber composition having improved cure time and improved processability. It would also be an advantage to provide a silica containing cured rubber composition produced by the foregoing process, or a silica containing rubber composition having the foregoing properties.

These and other advantages are obtained according to the present invention which comprises a process, product obtained by the process, and a composition that substantially obviates one or more of the limitations and disadvantages of the described prior art processes, products, and compositions.

The present invention comprises a process for manufacturing an uncured silica containing rubber composition having improved processability, improved resistance against the decay of processability during storage of the uncured stock and in some cases reduced cure time by combining the rubber with a class of organic compounds that impart these properties to the rubber composition. The invention also relates to uncured or cured silica containing rubber compositions produced by the process of the invention and uncured and cured silica containing rubber compositions having these organic compounds.

Additional features and advantages of the invention will be set forth in the written description which follows, and in part will be apparent from the description, or may be learned by practice of the invention. The objectives and other advantages of the invention will be realized and attained by the process, product-by-process and composition particularly pointed out in the written description and claims hereof as well as the appended drawings.

SUMMARY OF THE INVENTION

To achieve these and other advantages and in accordance with the purpose of the invention, as embodied and broadly described, the invention in one aspect comprises a process for improving the processability, storage stability and in some cases cure rate of silica reinforced rubber, compositions comprising the step of incorporating into said silica and rubber appropriate amounts (preferably less than about 10 phr) of at least one organic compound, such as an organic compound comprising a relatively low molecular weight organic compound (i.e., a molecular weight of from about 50 to less than about 7000, and especially from about 100 to about 2000) containing at least one functional group (preferably not intramolecularly reactive) and located in terminal or sterically unhindered positions on the molecule, selected from an epoxy functional group, such as an epoxy/ether, epoxy/hydroxyl, epoxy/ester, epoxy/amine, ether/amine, cycloaliphatic ether/hydroxyl, episulfide, episulfide/amine, episulfide/ether, episulfide/hydroxyl or episulfide/ester group. These compounds contain aliphatic and/or cycloaliphatic groups. Aliphatic groups comprise both saturated and unsaturated branched chain or straight chain alkyl groups, whereas cycloaliphatic groups include both saturated and unsaturated ring structures based on carbon, or heterocyclic ring structures based on carbon that contain, in addition to carbon in the ring, oxygen, or sulfur, or nitrogen.

The organic compound also comprises abietyl compounds and especially abietyl amine compounds, styrenated resorcinol formaldehyde epoxy polymer compounds, or ester hydroxy organic compounds that contain at least one hydroxyl and especially at least about two hydroxyl groups and at least one ester or one ether group, and combinations of any of the foregoing organic compounds.

In its broadest aspect, the process of the invention comprises incorporating the low molecular weight organic compound into the silica reinforced rubber by combining a mixture comprising rubber, silica and at least one organic compound as described herein in any sequence, i.e., it involves not only the addition of the organic compound to rubber already containing silica but also combining rubber, silica and the organic compound in any sequence or simultaneously.

The invention also comprises a product made by the aforesaid process including both uncured and cured rubber compositions and a composition of matter containing such organic compounds in a silica rubber composition, including both uncured and cured compositions of matter.

In another embodiment, the invention comprises uncured and cured rubber compositions used in tire, curing bladder and mechanical goods applications, and reinforced with silica or silica in combination with minor quantities of other particulate fillers such as carbon black, clay, silicates, and starch with —OH, —O—, or ester functionalities.

In a further embodiment, the invention comprises rubber compositions combined with certain specific abietyl, styrenated resorcinol formaldehyde, and ester hydroxy organic compounds that contain at least one hydroxyl and especially at least about two hydroxyl groups and at least one ester or ether group, found to improve the processability and storage stability of uncured silica reinforced rubber compositions. These ester hydroxy compounds generally comprise ester diols where the ester, ether and hyroxy groups comprise functional groups. The addition of these organic compounds surprisingly lowers the viscosity and also reduces the rate of increase of the viscosity of the uncured rubber composition as a function of storage time, compared to a control composition with none of these organic compounds.

The invention also comprises silica containing tire compositions such as those used in tread, tread cushion, sidewalls, carcass, belt, overlay, liner cushion, innerliner and bead area construction made from the aforesaid rubber compositions. In another aspect the invention relates to the use of the aforementioned organic compounds, especially epoxy compounds that reduce the cure time and increase the processability of rubber compositions.

The uncured rubber compositions of the invention containing silica or silica in combination With minor quantities of other particulate fillers, e.g., carbon black, clay, and the like, for use in tire compositions, have improved processability, storage stability and in some cases cure time. The organic compounds of the invention provide these enhancements in processing and/or cure properties.

The accompanying drawings are included to provide a further understanding of the invention and are incorporated in and constitute a part of this specification, illustrate several embodiments of the invention and together with the written description serve to explain the principles of the invention.

Figure 1:
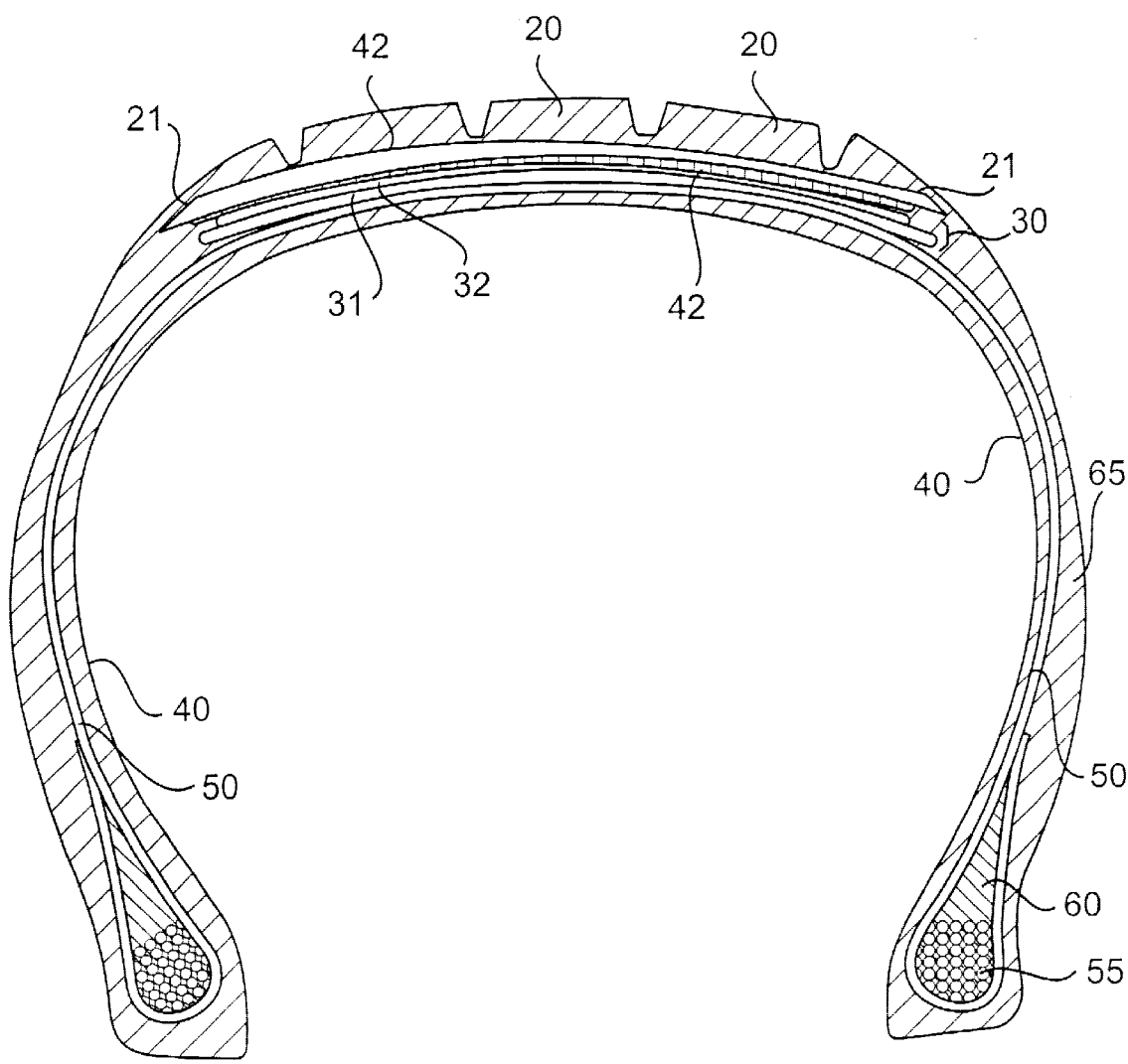
FIG. 1 shows a cross-section of a tire employing the composition of the invention.

It is to be understood that both the foregoing general description and the following detailed description are exemplary and explanatory and further, the following description is intended to provide a more detailed explanation of the invention as claimed.

DETAILED DESCRIPTION OF THE INVENTION

In the practice of the invention, the low molecular weight organic compound of the invention is employed as an ingredient in uncured silica reinforced rubber compositions to improve their processability stability, and/or cure kinetics, without significantly affecting the physical and dynamic properties of the vulcanizate or cured rubber compound.

Silica reinforced compositions comprise rubber compositions containing precipitated silica, pyrogenic silica, and silicates and combinations thereof, where silica is present as the major filler. Other fillers used in combination with silica comprise carbon black, clay, talc, calcium carbonate, calcium sulfate, bentonite, titanium dioxide and starch and combinations thereof. Pyrogenic silica and silicates are less desirable.

38604-99-8

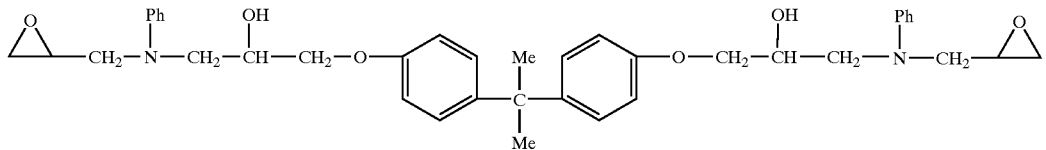

Useful low molecular weight organic compounds of this invention (molecular weight less than about 7000, or those having a molecular weight from about 50 to less than about 7000 and especially from about 100 to about 2000) comprise the following, compounds and combinations thereof:

N,N-diglycidyl aniline;
N,N-diglycidyl-4-glycidyl oxyaniline;
Glycidyl aniline;
Tris(2,3-epoxy propyl)isocyanurate

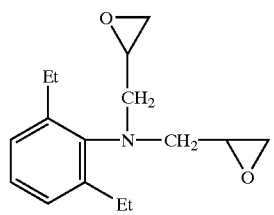

Oxiranemethanamine, N-(2,6-diethylphenyl)-N-(oxiranylmethyl)-(9Cl)

63804-34-2

Compound Number 1

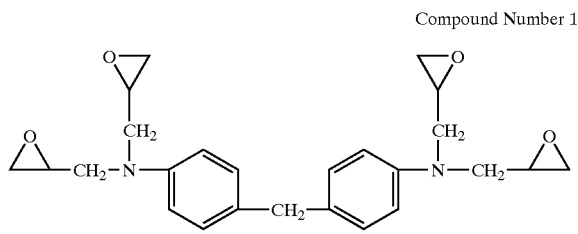

Component Number 2

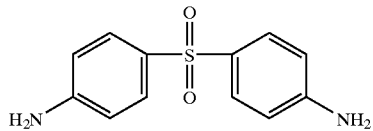

Oxiranemethanamine, N,N'-(methylenedi-4,1-phenylene)bis(N-(oxiranylmethyl)-, polymer with 4,4'-sulfonylbis(benzeneamine) (9Cl)

34229-69-1

Component Number 1

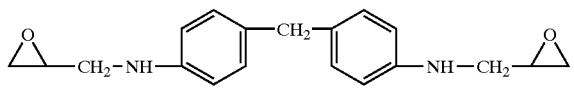

Oxiranemethanamine, N,N'-(methylenedi-4,1-phenylene)bis-, homopolymer (9Cl)

2-Propanol, 1,1'-[(1-methylethylidiene)bis(4,1-phenyleneoxy)]-bis(3-[(oxiranylmethyl)phenylamino]-(9Cl)

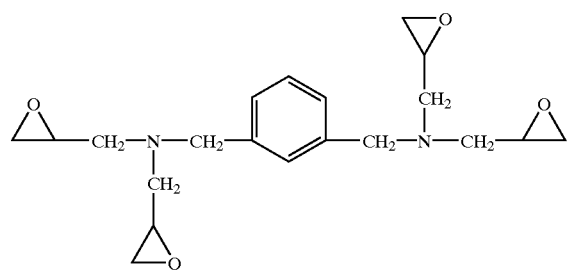

Component Number 2

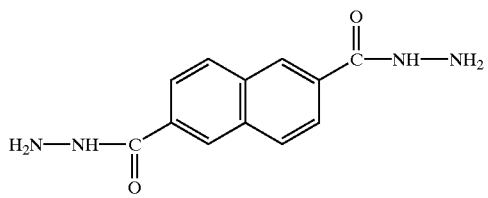

Component Number 3

2,6-Naphthalenedicarboxylic acid, dihydrazide, polymer with N-(oxiranylmethyl)-N-phenyloxiranemethanamine and N,N',N'-tetrakis(oxiranylmethyl)-1,3-benzenedimethanamine (9Cl)

51910-69-1

Component Number 1

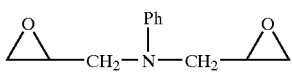

Component Number 2

H₂N—CH₂—CH₂—NH₂

1,2-Ethanediamine, polymer with N-(oxiranylmethyl)-N-phenyloxiranemethanamine (9Cl)

38605-00-4

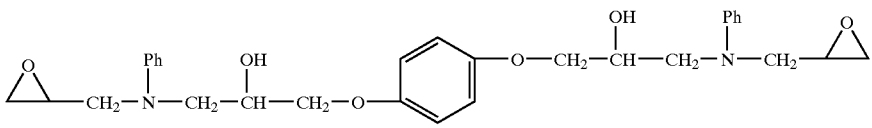

2-Propanol, 1,1'-[1,4-phenylenebis(oxy)]bis(3-[(oxiranylmethyl)phenylamino]-(9Cl)

Glycidyl vinyl benzyl ether;
Glycidyl (2,3-epoxy-1-propenyl)
Glycidyl vinyl ether;
2-Methyl-2-vinyl oxirane;
Vinyl glycidyl chalcogenides
1,2-Epoxy decene;
1,2-Epoxy-9-decene;

2-Butenedioic acid (2Z)-sodium salt, polymer with 1,3-butadiene, ethenylbenzene, 2,5-furandione, 2-methyl-1-propene and 2,2',2''-[1,2,3-propanethyltris(oxymethylene)]tris[oxirane], block (9Cl)

110713-42-3

Compound Number 1

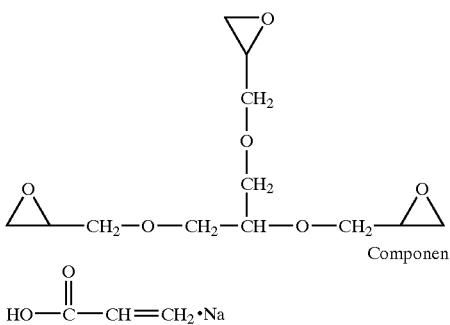

Component Number 2

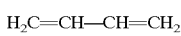

Component Number 3

H₂C=CH—CH=CH₂

Component Number 4

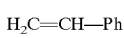

2-Propenoic acid, sodium salt, polymer with 1,3-butadiene, ethenylbenzene and 2,2',2''-[1,2,3-propanetriyltris(oxymethylene)]tris [oxirane], block (9Cl)

119692-59-0

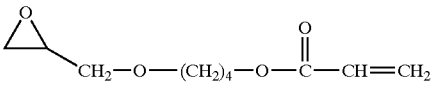

2-Propenoic acid, 4-(oxiranylmethoxy)butyl ester (9Cl)

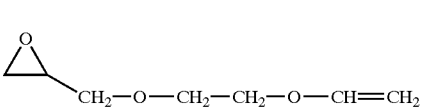

1H-indole, 1-ethenyl-4,5,6,7-tetrahydro-, polymer with [[2-(ethenyloxy)ethoxy]methyl]oxirane (9Cl)

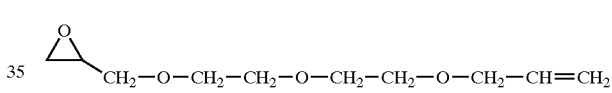

2(D1-Me)

Component Number 2

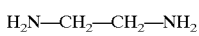

Oxirane, [[methyl-2-[methyl-2-(2-propenyloxy)ethoxy]ethoxy]methyl]-, polymer with oxirane (9Cl)
Polyglycidyl ether of castor oil;
Dimer acid diglycidyl ester;
Vinyl glycidyl chalcogenides and combinations thereof.

The vinyl glycidyl chalcogenides comprise those where the chalcogen comprises oxygen, sulfur, selenium or tellurium, and combinations thereof, but especially sulfur or selenium, and combinations thereof.

Examples of epoxy/hydroxyl compounds comprise bisphenol A or bisphenol F-epichlorohydrin reaction products which are glycidyl end-capped polymers such as the EPON® compounds from Shell Chemical Co. Polyglycidyl ethers of aliphatic polyols generally comprise polyalkylene glycol diglycidyl ethers where the alkylene group has from 2 to about 5 and especially from about 2 to about 3 carbon atoms, and anywhere from about 2 to about 1000, and especially from about 2 to about 500, and preferably from about 2 to about 10 repeating polyalkylene glycol units such as polypropylene glycol (3 moles) diglycidyl ether.

Examples of the dimer acid diglycidyl ester comprise diglycidyl esters of 3-hydroxypropylene oxide or 3-hydroxypropylene sulfide and aliphatic or cycloaliphatic acids (as those terms are defined herein) having anywhere from 2 to about 20 carbon atoms and especially from about 2 to about 10 carbon atoms such as the dimer acid diglycidyl ester Aldrich Chemicals No. 43, 030-7 (Aldrich Catalog 1998, 1999 incorporated herein by reference).

The polyglycol diepoxides include compounds such as glycerol diglycidyl ether, or diglycidyl ethers of polyhydroxy aliphatic compounds such as aliphatic compounds having anywhere from about 3 to about 6 carbon atoms and from 3 to about 6 hydroxyl groups well known in the art, but preferably glycerol diglycidyl ether.
Polypropylene glycol diglycidyl ether;
Isopropylglycidylether;
3,4-Epoxycyclohexylmethyl-3,4-epoxycyclohexanecarboxylate;
Diglycidyl-1,2-cyclohexane dicarboxylate;
2,3-Epoxypropyl benzene;
Exo-2,3-eoxynorbornane;
Poly(bisphenol A-co-epichlorohydrin) glycidyl end-capped;
Gycidyl 4-methoxy phenyl ether;
2-Ethyl hexyl diglycidyl ether;
Poly (phenylglycidyl ether)-co-formaldehyde;
Alkyl ($C_8$–$C_{12}$) glycidyl ethers;
Butyl glycidyl ether;
Cresyl glycidyl ether;
Phenyl glycidyl ether;
Nnonyl phenyl glycidyl ether;
P-tertiary butyl phenyl glycidyl ether;
Diglycidyl ether of 1,4-butanediol;
Diglycidyl ether of neopentyl glycol;
Diglycidyl ether of cyclohexane dimethanol;
Trimethylol ethane trigylcidyl ether;
Trimethylol propane trigylcidyl ether;
Diglycidyl ether of dibromoneopentyl glycol;
Polyglycol diepoxide, Mol. Wt. about 250 to less than 7,000;
Polyglycidyl ether of aliphatic polyol, Mol. Wt. about 250 to less than 7,000;
1,2 Epoxy butane;
Cis & trans 2,3-epoxy butane;
1,3 Butadiene diepoxide;
3,4-Epoxy-1-butene;
1,2-Epoxy cyclododecane;
1,4 Epoxycyclohexane;
1,2-Epoxy dodecane;
1,2-Epoxy hexadecane;
1,2-Epoxy octane;
1,2 Epoxy-7-octene;
1,2-Epoxy-3-phenoxypropane;
3,6 Epoxy-1,2,3,6 tetrahydrophthalic anhydride;
1,4,Cyclo hexane dimethanol diglycidyl ether;
Cyclohexene oxide;
Neopentyl glycol diglycidyl ether;
Neopentyl glycol diglycidyl ether, brominated;
Polyethylene glycol diglycidyl ether, Mol. Wt. about 250 to less than 7,000;
Polyethylene glycol glycidyl ether, Mol. Wt. about 250 to less than 7,000;
Polypropylene glycol glycidyl ether, Mol. Wt. about 250 to less than 7,000;
Low molecular weight (<700) epoxidized polyisoprene, polybutadiene and (poly) styrene-butadiene rubber and also with hydroxy functional groups;
Poly(ortho cresyl glycidyl ether)-co-formaldehyde];
Poly (dimethyl siloxane), diglycidyl ether terminated;
Poly (dimethyl siloxane)-co-[2,(3,4-epoxycyclohexyl) ethyl]methyl siloxane];
Trimethylol ethane triglycidyl ether;
Trimethylol propane trigylcidyl ether;
Polyglycidyl ether of castor oil;
Dimer acid diglycidyl ether;
N-(2,3-epoxypropyl)phthalimide;

9036-34-4

$\triangle$—$CH_2$—(O—($C_3H_6$)$)_n$—OPh

Poly[oxy(methyl-1,2-ethanedlyl)], α-(oxiranylmethyl)-ω-phenoxy-(9Cl)

14435-46-2

$\triangle$—$CH_2$—O—$CH_2$—$CH_2$—OPh

Oxirane, [(2-phenoxyethoxy)methyl]-(9Cl)

19614-67-6

$\triangle$—$CH_2$—N(Ph)—Et

Oxiranemethanamine, N-ethyl N phenyl-(9Cl)

203944-15-4

Component Number 1

$\triangle$—$CH_2$—O—$CH_2$—$CH_2$—O—$CH_2$—$CH_2$—OMe

Component Number 2

$\triangle$

Oxirane, [[2-(2-methoxyethoxy)ethoxy]methyl]-, polymer with oxirane, graft (9Cl)

40349-67-5

$\triangle$—$CH_2$—O—($CH_2$—$CH_2$—O$)_n$—Me

Poly(oxy-1,2-ethanediyl), α-methyl-ω-(oxiranylmethoxy)-(9Cl)

$\triangle$—$CH_2$—O—$CH_2$—$CH_2$—O—$CH_2$—$CH_2$—OMe

Oxirane, [[2-(2-methoxyethoxy)ethoxy]methyl]-(9Cl)

203863-90-5

Component Number 1

$\triangle$(Me)—$CH_2$—O—$CH_2$—$\triangle$

Component Number 2

$$\text{\epoxide}-CH_2-O-CH_2-CH_2-O-CH_2-CH_2-O-CH_2-CH_2-OMe$$

Component Number 3

$$\text{\epoxide}$$

Oxirane, 2-methyl-2-[(oxiranylmethoxy)methyl]-, polymer with oxirane and 2,5,8,11-tetraoxadodec-1-yloxirane, graft (9Cl)

Component Number 1

$$\text{\epoxide}-CH_2-O-CH_2-CH_2-O-CH_2-CH_2-O-CH_2-\text{\epoxide}$$

Oxirane, 2,2'-[oxybis(2,1-ethanediyloxymethylene)]bis-, homopolymer (9Cl)

54951-97-2

Component Number 1

$$\text{\epoxide}-CH_2-O-[CH_2-CH_2-O]_n-CH_2-\text{\epoxide}$$

Component Number 2

$$HO_2C-(CH_2)_3-CO_2H$$

Pentanedioic acid, polymer with α-(oxiranylmethyl-ω-(oxiranylmethoxy)poly(oxy-1,2-ethanediyl) (9Cl)

203863-88-1

$$\text{\epoxide}-CH_2-O-[CH_2-CH_2-O]_n-Me$$

$$\text{\epoxide}-CH_2-O-(CH_2)_3-O-CH_2-\text{\epoxide}$$

2 (Dl-Me)

Oxirane 2,2'-[(dimethyl-1,3-propanediyl)bis(oxymethylene)]bis-(9Cl)

203863-92-7

Component Number 1

$$\text{\epoxide}-CH_2-O-CH_2-CH_2-O-CH_2-CH_2-OPr-n$$

Component Number 2

$$\text{\epoxide}(Me)-CH_2-O-CH_2-CH_2-O-CH_2-CH_2-O-CH_2-\text{\epoxide}$$

Component Number 3

$$\text{\epoxide}$$

Oxirane, 2-methyl-2-[[2-[2-(oxiranylmethoxy)ethoxy] ethoxy]methyl]-, polymer with oxirane and [[2-(2-propoxyethoxy)ethoxy]methyl]oxirane, graft (9Cl)
Isopropylene sulfide;
Isobutylene sulfide;
Methyl thiirane;
1,2 Epithio-3-phenyl propane;
Thiirane-2,3-diphenyl;
Oxalic acid, 1,2-dithio-,cyclid C,S-spiro[thiirane-2, 9'thioxanthen]-3-ylidene ester;
3-(Methoxy) propylene sulfide;
1-Buten-2-amine, N,N-diethyl-3-methyl-3-(thiiranyl methoxy)-hydrochloride;
1-Propen-2-amine, N,N-diethyl-3-(thiiranyl methoxy)-hydrochloride;
1-Hexene-2-amine, N,N-diethyl-3-(thiiranyl methoxy)-hydrochloride;
Epithio-1,1-bis[p-(dimethylamino)-phenyl]-2,2-bis-(p-chlorophenyl)-ethane;
3-(Diethyl)amine
9H-Purin-6-amine, 9-(thiiranyl methyl);
1-Propene-2-amine, N,N-diethyl-3-(thiranyl methoxy)-hydrochloride;
1-Hexen-2-amine, N,N-diethyl-3-(thiiranyl methoxy)-hydrochloride;
1-Butene-2-amine, N,N-diethyl-3-methyl-3-(thiiranyl methoxy). 3-Hydroxy propylene sulfide;
Thiirane propanenitrile, β-hydroxy.
3-(Ethyl ester)-1,2-dimethyl propylene sulfide;
Spiro [9H-fluorene-9,2'-thiirane]-3-acetic acid, 3'-(methoxy carbony)-α-(phenyl amino)-, methyl ester;
Spiro[thiirane-2,9'-[9H]xanthene]-3,3dicarboxylic acid, dimethyl ester;
Spiro [thiirane-2,9'-[9H]thioxanathene]-3,3-dicarboxylic acid dimethyl ester.
Glycidyl acrylate;
Glycidyl metharcylate;
Glycerol propoxylate trigylcidyl ether;
Glycidyl 3-nitrobezene sulfonate;
Glycidyl 4-nitrobezoate;
Glycidyl tosylate;
N-(2,3-epoxy propyl)phthalimide;
Poly(ethylene-co-glycidyl methacrylate),Mol. Wt. about 250 to less than 7,000;
Glycidyl butyrate;
Glycidyl neodcanoate;

$$\text{\epoxide}-CH_2-O-\text{\benzene}-C(=O)-O-CH_2-\text{\epoxide}$$

$$HO-CH_2-CH_2-O-CH_2-CH_2-OH$$

$$HO_2C-(CH_2)_8-CO_2H$$

Decanedioic acid, polymer with oxiranylmethyl 4-(oxiranylmethoxy)benzoate and 2,2'-oxybis[ethanol](9Cl)
Glycidyl isobutyl ether;
Glycidyl methyl ether;
Glycidyl 2-methyl phenyl ether;
Glycidyl 4-nonyl phenyl ether;
Glycidyl pentyl ether;
Glycidyl propyl ether;
Glycidyl trityl ether;
Glycidyl undecyl ether;
Glycidyl hexadecafluoro nonyl ether;
Glycidyl octafluoro pentyl ether;
Dodecyl glycidyl ether;
Tetradeycl glycidyl ether;

Furfuryl glycidyl ether;
Limonene oxide;
Poly [glycidyl 3-pentadecadizenyl];
Phenyl ether-co-formaldehyde;

The abietyl amine compounds employed according to the present invention include the alkylene oxide addition products of the amines of abietic acid as well as the isomers and homologues of these amines of abietic acid, which include without limitation, the pimaric, andaracopimaric, palustric, elliotinoic and podocarpic isomers and homologues, especially hydrogenated or dehydrogenated abietic acid amines, and the isomers and homologues thereof (e.g., the dehydro abietic acid amines and isomers and homologues), and include both primary and secondary amines, and combinations thereof. These alkylene oxide addition products may be admixed with the amines of abietic acid (as defined herein) so that the latter may be present in amounts less than about 1% by weight up to about 50% by weight, and especially less than about 1% by weight up to about 15% by weight. In one embodiment, the secondary amines are present in minor amounts, e.g., less than about 1%. These alkylene oxide adducts have from 2 to about 5 carbon atoms, and especially from 2 to about 3 carbon atoms, the adduct also having anywhere from about 2 to about 25 moles of alkylene oxide, especially from about 3 to about 20 moles of alkylene oxide. These organic compounds reduce viscosity and improve processability and storage stability.

Specific abietyl amine organic compounds employed according to the invention comprise Polyrad® 0515 (Hercules, Incorporated), ethoxylated (5 moles) dehydroabietylamine with about 15% dehydroabietyl amine, Polyrad® 1110, ethoxylated (11 moles) dehydrohydroabietylamine with about 10% dehydroabietyl amine, including both primary and scondary amines, and combinations thereof.

A styrenated resorcinol formaldehyde epoxy polymer employed according to the invention comprise Penacolite® CRL-411 resin, 2,2'-bis(3-[3-(3-hydroxyphenoxy)-2-hydroxy-propoxy]phenyl)propane, a reaction product of resorcinol, formaldehyde, styrene and Bisphenol A diglycidylether polymer, supplied by Indspec Chemical Corp, also known as 2,2'-bis[3-(3-(3-hydroxyphenoxy)-2-hydroxy-propoxy]-phenyl)propane reaction product with styrene. The styrene attaches to one or both hydroxyphenoxy groups by an addition reaction to form an ethylidene phenyl moiety or ethylene phenyl moiety on the group.

Ester hydroxyl compounds containing hydroxyl, ester and optionally ether groups or an ester diol employed according to the invention comprise benzoic acid, hydroxy-3-{(1-oxoneodecyl)oxy}propyl ester (EXX-RD 85 from Exxon Chemical Co) and combinations thereof. Both the styrenated resorcinol formaldehyde epoxy polymer and ester hydroxyl compound reduce viscosity and improve processability and storage stability.

Other ester hydroxyl compounds containing hydroxyl, ester and optionally ether groups that may be employed according to the invention especially comprise ester diols such as propanoic acid, 3-hydroxy-2,2-dimethyl-, 3-hydroxy-2,2-dimethylpropyl ester (Chemical Abstracts Registry No.1115-20-4), and the art known derivatives thereof as given in Chemical Abstracts and incorporated herein by reference, decanedioic acid, polymer with 2-ethyl-2-(hydroxymethyl)-1,3-propanediol and 3-hydroxy-2,2-dimethylpropyl, 3-hydroxy-2,2-dimethylpropanoate (Chemical Abstracts Registry No. 193749-51-8), also known as Ester Diol 204-sebacic acid-trimethylolpropane copolymer having the molecular formula $(C_{10}H_{20}O_4 \cdot C_{10}H_{18}O_4 \cdot C_6H_{14}O_3)_x$ where x equal from about 2 to about 1000 and especially from about 4 to about 750; propanoic acid, 3-hydroxy-2,2-dimethyl-, 3-hydroxy-2,2-dimethylpropyl-ester, polymer with hexahydro-1,3-isobenzofurandione and hexahydromethyl-1,3-isobenzofurandione (Chemical Abstract Registry No. 228545-55-9), also known as Ester Diol 204-hexahydrophthalic anhydride-methylhexahydrophthalic anhydride copolymer, molecular formula $(C_{10}H_{20}O_4 \cdot C_9H_{12}O_3 \cdot C_8H_{10}O_3)_x$ where x equal from about 2 to about 1000, and especially from about 4 to about 750; propanoic acid, 3-hydroxy-2,2-dimethyl-,3-hydroxy-2,2-dimethylpropyl ester, polymer with 2-ethyl-2-(hydroxymethyl)-1,3-propanediol and hexahydromethyl-1,3-isobenzofurandione (Chemical Abstract Registry No. 173196-70-8), molecular formula $(C_{10}H_{20}O_4 \cdot C_9H_{12}O_3 \cdot C_6H_{14}O_3)_x$ where x equal from about 2 to about 1000 and especially from about 4 to about 750.

The silica containing rubber compositions have from about 0.1 to about 30 phr or preferably from about 0.5 to about 6 phr of the organic compounds.

The term "rubber" comprises any natural or synthetic rubber or various blends, especially those suitable for tires, such as the rubbers listed in U.S. Pat. Nos. 5,219,944; 5,504,137; 5,162,409; 5,665,812; 5,396,940; 5,489,628; 5,905,112; 4,519,430; 5,885,389; 5,886,086; 3,873,489; 5,227,425; 5,063,268 and European Patent Application No. EP 0780429A1.

The organic compounds combined with, mixed, or compounded with any natural and/or synthetic rubber or various blends of rubber. The term "natural rubber" means rubber obtained from plant sources, such as Hevea braziliensis and Guayule, or their chemical equivalents, such as synthetic cis-1,4-polyisoprene (IR) and derivatives such as epoxidized or methacrylate grafted rubber. The term "synthetic rubber" means any rubber produced synthetically, via emulsion, solution or bulk or a gas phase process, such as polybutadiene (BR), chlorobutadiene rubber, epichlorohydrin rubber, polyisoprene, styrene/butadiene copolymers (SBR), styrene/isoprene/butadiene (SIBR) terpolymers, para or ortho methylstyrene/isoprene/butadiene rubber, para or ortho methylstyrene/butadiene rubber, butadiene/acrylonitrile copolymers, isoprene/acrylonitrile copolymers, ethylene/propylene/diene rubber (EPDM), butyl rubber isobutylene-isoprene copolymer and its halogenated derivatives, brominated para-methyl styrene isobutylene rubber, butadiene/styrene/acrylonitrile terpolymers, isoprene/butadiene/acrylonitrile terpolymers, isoprene/butadiene copolymers, butadiene-alkyl acrylate or methacrylate copolymer, styrene/butadiene/alkylacrylate or alkylmethacrylate rubbers, SBR, SIBR, BR rubbers modified with silica or carbon black reactive compounds and combinations of the aforementioned rubbers with each other and/or with natural rubber. Blends of rubbers are preferred in some embodiments.

The organic compounds of the invention are combined, i.e., blended or mixed, with conventional tire composition ingredients and additives, known to those skilled in the art, comprising rubbers, processing aids, antioxidants, antiozonants, fillers, aromatic oils, hydrogenated aromatic oils, naphthenic oils, waxes, silica coupling systems, adhesion promoters, resins, coupling systems for silica (as described in European Patent Application EP 0780429A1; U.S. Pat. Nos. 4,229,333; 3,873,489; 5,504,137; 5,162,409; M. P. Wagner, Rubber Chemistry and Technology, 49, p.703–773, 1976; R. J. Pickwell, Rubber Chemistry and Technology, 56, p.94–104, 1983), crosslinking systems or curing systems and combinations thereof. Processing aids include, but are not limited to plasticizers, tackifiers, extenders, chemical conditioners, homogenizing agents, and peptizers such as mercaptans, synthetic oils, petroleum and vegetable oils, paraffin oils, hydrogenated aromatic oils, resins, rosins and the like and combinations thereof. Accelerators but are not limited to include guanidines, thioureas, thiurams, sulfenamides, thiocarbamates, amines, xanthates, thiazoles and the like and combinations thereof. Crosslinking systems or curing systems include peroxides, sulfur, sulfur donors, accelerators, zinc oxides and fatty acids and combinations thereof. Fillers include but are not limited to reinforcing and/or conductive carbon black, clay, silica, bentonite, titanium dioxide, talc, calcium carbonate, calcium sulfate, silicates, starch and short vegetable or synthetic fibers or pulp, and the like, and combinations thereof.

Compositions of the invention are typically combined, i.e., blended, or mixed with one another using conventional rubber compounding apparatus, in a single step or in multiple steps in a batch or continuous internal mixer, such as a Banbury, Intermesh mixer single-screw extruder, counter or corotating twin screw extruder or on a two-roll mill until a homogeneous blend is obtained.

Referring to FIG. 1, rubber compositions of this invention can be used in the construction of various components of a tire, e.g., in tire treads 20 and/or sidewalls 65, bead fillers 60, components of the bead area, including the bead composition 55, tread cushion 21, belt 30, inner liner 40, overlay 42, and carcass 50 of a tire. Disposed crown-wise to the tire carcass 50, in the usual manner, is a tread component or band 20, and inserted between the carcass and the tread band or tread cushion is a belt structure 30 and above the belt an optional overlay component, above which lies a tread cushion 42 capped by the tread 20. The belt comprises two radially superimposed layers, 31 and 32, of cords disposed at angles with respect to the mid circumferential plane of the tire in opposite directions, preferably symmetrically. Extending from tread portion 20 toward bead area 55 on the tire exterior is the sidewall 65, which may comprise the same rubber composition as the tread portion 20 or preferably a different rubber composition.

The following examples are presented to further illustrate and explain the present invention. Unless otherwise mentioned, all parts and percentages are by weight. All physical and mechanical measurements were conducted using industry standard test methods or special methods as indicated.

EXAMPLES

Rubber compositions containing the materials listed in Tables 1, 3, 5, 7, 9, 11, 13 and 16 were combined, i.e., mixed in a Brabender Plasticorder (420 ml) mounted with cam rotors by using a fill factor of 0.7, a rotor velocity of 75 rpm (drive to drive ratio, 3:2) and a starting temperature of 100° C. After mixing, the compounds were masticated at room temperature on a two-roll mill (22–24° C.) for 7 minutes. The curatives (CBS, DPG80, sulfur) as noted were added on mill, when necessary. The mixing sequence is shown here below and is the same for all of the compounds studied:

| MIXING TIME (in min.) | INGREDIENTS ADDED |
| --- | --- |
| 0 | polymer |
| 2 | silica + all ingredients except 6 PPD |
| 5.5 | 6 PPD |
| 6.5 | End |
| Starting mixing temperature | 100° C. |
| Total mixing time above 150° C. (min.) | 2.5 |
| Final temperature | 165–167° C. |

In all of the cases listed in Tables 1, 3, 5, 7, 9, 11, 13, 16, solution SBR is styrene butadiene rubber with 25% styrene and 55% vinyl; silica is precipitated silicon dioxide (VN3 from Degussa Corp.); carbon black is Vulcan 1380 from Cabot Corp.; 6PPD is N-1,3-dimethylbutyl-N'-p-phenylenediamine; X50S is a 50% dispersion of 3,3'-bis (triethoxysilylpropyl)tetrasulfide (TESPT) in N330 carbon black; wax is microcrystalline wax; aromatic oil is Sundex 8125 from Sun Oil Co.; DPG80 is 80% diphenylguanidine dispersed on an inert carrier; CBS is N-cyclohexylbenzothiazolesulfenamide; all amounts are in parts by weight per hundred parts of rubber.

Tables 2, 4, 6, 8, 10, 12, 14, 17 list the cure characteristics, tensile properties of the vulcanizate and processability of the uncured compositions whose compositions are shown in Tables 1, 3, 5, 7, 9, 11, 13, 16. Table 15 only lists the processability characteristics of uncured compositions with and without curing ingredients (sulfur, CBS, DPG80). The curing behavior of the compounds was measured at 160° C. by using a Monsanto Rheometer 100 with an arc angle of 3° (ASTM D2084). A marching cure was observed in all cases. For measuring physical properties of the compositions, a cure time of 60 minutes was employed for silica and silica/carbon black filled compositions, and a cure time of 40 minutes was employed for carbon black filled compositions. A mold lag time of 5 minutes was added in all cases to the cure time. Because of the marching cure, i.e., "$t_{90}$" or optimum cure is defined as the time needed for the measured torque of a modified composition (with epoxy compounds, and the like as the additive) to reach the value of that of a control recipe (without any organic compound) after 60 minutes for a silica-filled composition, and after 40 minutes for a carbon black-filled composition. Five minutes were added to the obtained value for mold lag.

Processability is defined inversely as the roughness of the surface of the extrudate after an extrusion experiment. The extrudate is defined as the product of an extrusion experiment. The processability was evaluated by the measure of the peak stress during a slow start-up flow experiment performed by using a modified multi speed Mooney viscometer equipped with a grooved biconical rotor, at a rotor rotation speed of 0.1 rpm at 120° C. after a preheating period of 10 minutes (S. Schaal and A. Y. Coran, Paper No. 46, presented at a meeting of the Rubber Division, American Chemical Society, Orlando, Fla., Sep. 21–24, 1999). The higher the maximum stress, which is called Mooney peak, the poorer the processability, i.e., the greater the roughness of the extrudate after an extrusion experiment. Processability, as defined here, is measured after a storage period of 8 days at 70° C. The processability index (PI) is defined as the ratio of the height of the Mooney peak of the modified composition to the height of the Mooney peak exhibited by the control composition. The lower the value of PI, the more improvement in processability compared to the control composition. Unless specified, all the processability measurements were made on non-productive compositions, i.e., compositions that do not contain any curing ingredients (CBS, DPG80, sulfur).

In order to evaluate the effect of the additives on the mechanical properties measured in tension, each modified composition, i.e., containing an additive, was then compression molded in a 2 mm-thick mold under 24 MPa at 160° C. for a period equal to $t_{90}$ plus 5 minutes. As mentioned above, the cure time for a control recipe, i.e., without additive, was arbitrarily set at 65 minutes. In some cited cases, all the specimens were cured for 60 minutes at 160° C. in the case of silica-filled compositions and 45 minutes in the case of carbon black filled compositions. Dumbbell shape specimens (ASTM D412, die type C) were cut from the 2 mm-thick sheet obtained after curing. The tensile test was performed at room temperature at a crosshead speed of 500 mm/min on the cured composition. Ultimate strength, ultimate strain, modulus at 100% strain (M100), modulus at 300% strain (M300) were recorded. The ratio M300/M100 was calculated as a measure of the filler dispersion quality (Cf. Rauline, U.S. Pat. No. 5,227,425). The higher the M300/M100 ratio, the better the dispersion of the filler particles in the rubber matrix.

Example 1

A silica reinforced rubber composition was used for the evaluation of the effect of epoxy-containing organic compounds on the cure characteristics and the tensile properties of the vulcanizate as well as on the processability of the uncured compositions. Table 1 gives the compositions. The properties mentioned above are reported in Table 2. SS01 represents the control composition. The addition of N,N-diglycidylaniline (SS02) provides a substantial decrease in curing time compared to the control composition. The Mooney peak and the processability index of SS02 are much lower than that of SS01. This indicates that the addition of N,N-diglycidylaniline to the control composition leads to a significant improvement of the resistance to adverse rheological changes that occur during storage. It can also be seen than N,N-diglycidylaniline (SS02) is much more effective than low molecular weight glycols such as di(ethyleneglycol)diethylether (SS03) or di(ethyleneglycol)ethylether acetate (SS04) for processability after storage.

TABLE 1

| Formulations | | | | |
|---|---|---|---|---|
| | SS01 | SS02 | SS03 | SS04 |
| solution SBR | 100 | 100 | 100 | 100 |
| silica | 60 | 60 | 60 | 60 |
| X50S | 9.6 | 9.6 | 9.6 | 9.6 |
| stearic acid | 3 | 3 | 3 | 3 |
| zinc oxide | 2 | 2 | 2 | 2 |
| 6PPD | 1.5 | 1.5 | 1.5 | 1.5 |
| wax | 1 | 1 | 1 | 1 |
| aromatic oil | 12 | 12 | 12 | 12 |
| N,N-diglycidylaniline | — | 2 | — | — |
| Di(ethyleneglycol)diethylether* | — | — | 2 | — |
| Di(ethyleneglycol)ethylether acetate* | — | — | — | 2 |
| Curing system: | | | | |
| sulfur | 1.2 | 1.2 | 1.2 | 1.2 |
| CBS | 1.8 | 1.8 | 1.8 | 1.8 |
| DPG80 | 1.25 | 1.25 | 1.25 | 1.25 |

*These two glycols were used as reference for comparison, Cf., M. P. Wagner, Rubber Chemistry and Technology, 49, 703, 1976

TABLE 2

| Cure, Physical and Processing Properties | | | | |
|---|---|---|---|---|
| | SS01 | SS02 | SS03 | SS04 |
| Cure characteristics (ASTM D2084) | | | | |
| $t_2$ (min.) | 6.5 | 6.7 | 6.9 | 6.4 |
| cure time (min.) | 65 | 52 | 58 | 51 |
| Tensile properties (ASTM D412) | | | | |
| Elongation at break (%) | 356.25 | 342.20 | 346.62 | 353.42 |
| Stress at break (MPa) | 19.53 | 18.42 | 18.14 | 18.67 |
| M100(MPa) | 3.49 | 3.71 | 3.46 | 3.40 |
| M300(MPa) | 15.65 | 15.64 | 15.04 | 15.08 |
| M300/M100 | 4.48 | 4.22 | 4.35 | 4.44 |
| Processability | | | | |
| Mooney peak (kPa) | 119.0 | 69.5 | 104.0 | 115.0 |
| processability index | 1.00 | 0.58 | 0.87 | 0.97 |

Processability was measured on non productive recipes, i.e., without the curing system. The curing system was added on a room-temperature two-roll mill for the evaluation of the curing characteristics.

Example 2

In this example, the compositions and their properties are shown in Table 3 and Table 4 respectively. SS05 is the control composition with a silane coupling system (TESPT). SS08 is a composition without a silane coupling system (TESPT). It can be seen that the presence of the coupling system significantly improves the cure rate and the mechanical properties and especially, the M300/M100 ratio, which is a measure of the quality of the dispersion of the filler in the matrix (cf. Rauline U.S. Pat. No. 5,227,425). The processability index, however, is not significantly affected. By comparing the properties of SS06 and SS07 to those of SS05, it can be concluded that the addition of N,N-diglycidyl-4-glycidyloxyaniline and ethoxylated hydroabietyl amine to the control composition (with coupling system, e.g., TESPT), not only improve the cure rate significantly, i.e., reduced cure time, but also lead to a significant improvement of the storage stability especially in the case of N,N-diglycidyl-4-glycidyloxyaniline. By comparing the properties of SS08 and SS09, it can be concluded that the addition of polypropylene glycol diglycidylether to a control recipe that does not contain any silane coupling system unexpectedly decreases the value of the processability index; this may suggest the occurrence of a chemical reaction between the silica surface silanols with the epoxy moiety of the organic compound.

TABLE 3

| Formulations | | | | | |
|---|---|---|---|---|---|
| | SS05 | SS06 | SS07 | SS08 | SS09 |
| solution SBR | 100 | 100 | 100 | 100 | 100 |
| silica | 60 | 60 | 60 | 60 | 60 |
| TESPT (X50S) | 9.6 | 9.6 | 9.6 | — | — |
| stearic acid | 3 | 3 | 3 | 3 | 3 |
| zinc oxide | 2 | 2 | 2 | 2 | 2 |
| 6PPD | 1.5 | 1.5 | 1.5 | 1.5 | 1.5 |
| wax | 1 | 1 | 1 | 1 | 1 |
| aromatic oil | 12 | 12 | 12 | 12 | 12 |
| N,N-diglycidyl-4-glycidyloxyaniline | — | 2 | — | — | — |
| Ethoxylated dehydroabietyl amine[a] Mixture | — | — | 2 | — | — |
| Polypropylene-glycoldiglycidylether | — | — | — | — | 2 |
| Curing system: | | | | | |
| sulfur | 1.2 | 1.2 | 1.2 | 1.2 | 1.2 |
| CBS | 1.8 | 1.8 | 1.8 | 1.8 | 1.8 |
| DPG80 | 1.25 | 1.25 | 1.25 | 1.25 | 1.25 |

[a]Polyrad ® 0515 from Hercules Incorporated, a mixture of 85 parts of 5 moles ethoxylated dehydroabietyl amine and 15 parts of dehydroabietyl amine. The polypropyleneglycoldiglycidyl ether in this and all other examples had a formula weight of 304.

TABLE 4

| Cure, Physical and Processing Properties | | | | | |
|---|---|---|---|---|---|
| | SS05 | SS06 | SS07 | SS08 | SS09 |
| Cure characteristics (ASTM D2084) | | | | | |
| $t_2$ (min.) | 6.5 | 5.2 | 6.6 | 6.5 | 10.6 |
| cure time (min.) | 65 | 53 | 50 | 145* | 173* |
| Tensile properties (ASTM D412) | | | | | |
| Elongation at break (%) | 364.47 | 356.43 | 362.89 | 549.05 | 595.92 |
| Stress at break (MPa) | 18.49 | 19.71 | 19.41 | 15.94 | 13.64 |

TABLE 4-continued

Cure, Physical and Processing Properties

|  | SS05 | SS06 | SS07 | SS08 | SS09 |
|---|---|---|---|---|---|
| M100 (MPa) | 3.18 | 3.78 | 3.63 | 2.73 | 1.84 |
| M300 (MPa) | 14.15 | 16.05 | 15.35 | 6.54 | 4.59 |
| M300/M100 | 4.45 | 4.25 | 4.23 | 2.40 | 2.50 |
| Processability |  |  |  |  |  |
| Mooney peak (kPa) | 103.0 | 61.5 | 98.6 | 111.0 | 50.9 |
| processability index | 1.00 | 0.60 | 0.96 | 1.08 | 0.49 |

*numbers obtained from extrapolation by assuming a 1$^{st}$ order reaction after 60 minutes of cure
Processability was measured on non productive recipes, i.e., without the curing system. The curing system was added on a room-temperature two-roll mill for the evaluation of the curing characteristics.

Example 3

In this example, the compositions and their properties are shown in Table 5 and Table 6 respectively. SS10 is the control composition. Epoxidized soybean oil (SS11) and 25 mol percent epoxidized natural rubber (ENR25) at low levels (SS12) both reduce the cure rate while lowering the processability index in a silica-filled composition. Table 6 shows that low molecular weight epoxy compounds such as diglycidyl-1,2-cyclohexanedicarboxylate (SS13) and exo-2,3-epoxynorbornane (SS15) both increase the cure rate and reduce the value of the processability index even further than do either epoxidized soybean oil or ENR25. This shows that the use of low-molecular-weight epoxy compounds according to the invention provides unexpected superior resistance to unfavorable rheological changes that occur during storage in the case of silica-filled rubber compositions, when compared to epoxidized soybean oil and ENR25 as illustrated by Segatta et al, U.S. Pat. No. 5,396,940; and Sandstrom, U.S. Pat. No. 5,489,628. It should be noted that no beneficial effect on viscosity of epoxidized soybean oil is observed when carbon black is the predominant filler as shown by Stevens et al., DE 19700967 A1.

TABLE 5

Formulations

|  | SS10 | SS11 | SS12 | SS13 | SS14 | SS15 |
|---|---|---|---|---|---|---|
| solution SBR | 100 | 100 | 100 | 100 | 100 | 100 |
| silica | 60 | 60 | 60 | 60 | 60 | 60 |
| X50S | 9.6 | 9.6 | 9.6 | 9.6 | 9.6 | 9.6 |
| stearic acid | 3 | 3 | 3 | 3 | 3 | 3 |
| zinc oxide | 2 | 2 | 2 | 2 | 2 | 2 |
| 6PPD | 1.5 | 1.5 | 1.5 | 1.5 | 1.5 | 1.5 |
| wax | 1 | 1 | 1 | 1 | 1 | 1 |
| aromatic oil | 12 | 12 | 12 | 12 | 12 | 12 |
| Epoxidized soybean oil | — | 2 | — | — | — | — |
| ENR 25 | — | — | 2 | — | — | — |
| Diglycidyl-1,2-cyclohexanedicarboxylate | — | — | — | 2 | — | — |
| (2,3-epoxypropyl)benzene | — | — | — | — | 2 | — |
| exo-2,3-epoxynorbornane | — | — | — | — | — | 2 |
| Curing system: |  |  |  |  |  |  |
| sulfur | 1.2 | 1.2 | 1.2 | 1.2 | 1.2 | 1.2 |
| CBS | 1.8 | 1.8 | 1.8 | 1.8 | 1.8 | 1.8 |
| DPG80 | 1.25 | 1.25 | 1.25 | 1.25 | 1.25 | 1.25 |

TABLE 6

Cure, Physical and Processing Properties

|  | SS10 | SS11 | SS12 | SS13 | SS14 | SS15 |
|---|---|---|---|---|---|---|
| Cure characteristics (ASTM D2084) |  |  |  |  |  |  |
| t$_2$ (min.) | 6.0 | 6.9 | 6.2 | 6.3 | 7.0 | 6.8 |
| cure time (min.) | 60 | 60 | 60 | 60 | 60 | 60 |
| t$_{90}$ (min.) | 65 | 92 | 68 | 44 | 88 | 53 |
| Tensile properties (ASTM D412) |  |  |  |  |  |  |
| Elongation at break (%) | 340.2 | 416.8 | 348.6 | 341.6 | 371.7 | 341.8 |
| Stress at break (MPa) | 18.10 | 19.10 | 16.90 | 18.55 | 17.66 | 17.92 |
| M100 (MPa) | 3.26 | 2.67 | 3.11 | 3.58 | 3.09 | 3.44 |
| M300 (MPa) | 14.87 | 11.79 | 13.80 | 15.64 | 13.14 | 15.02 |
| M300/M100 | 4.56 | 4.42 | 4.44 | 4.37 | 4.25 | 4.37 |

TABLE 6-continued

Cure, Physical and Processing Properties

|  | SS10 | SS11 | SS12 | SS13 | SS14 | SS15 |
|---|---|---|---|---|---|---|
| Processability |  |  |  |  |  |  |
| Mooney peak (kPa) | 120.0 | 85.8 | 85.0 | 57.3 | 68.1 | 65.3 |
| processability index | 1.00 | 0.72 | 0.71 | 0.48 | 0.57 | 0.54 |

Processability was measured on non productive recipes, i.e., without the curing system. The curing system was added on a room-temperature two-roll mill for the evaluation of the curing characteristics.

Example 4

In this example, the compositions and their properties are shown in Table 7 and Table 8 respectively. SS16 is the control composition. Table 8 shows that all of the organic compounds mentioned below reduce the cure time and improve the processability, after storage, of silica filled rubber compositions: poly(Bisphenol A-co-epichlorhydrin) glycidyl end-capped, MW=380, poly(Bisphenol A-co-epichlorhydrin) glycidyl end-capped, MW=6100, glycidylbutyrate, Penacolite® CRL-411 resin (reaction product of resorcinol, formaldehyde, styrene and Bisphenol A diglycidylether polymer, Indspec Chemical Corp.), an ester diol (EXXRD-85 from Exxon Chemical Co.), and glycidylneodecanoate.

TABLE 7

| Formulations | SS16 | SS17 | SS18 | SS19 | SS20 | SS21 | SS22 |
|---|---|---|---|---|---|---|---|
| solution SBR | 100 | 100 | 100 | 100 | 100 | 100 | 100 |
| silica | 60 | 60 | 60 | 60 | 60 | 60 | 60 |
| X50S | 9.6 | 9.6 | 9.6 | 9.6 | 9.6 | 9.6 | 9.6 |
| stearic acid | 3 | 3 | 3 | 3 | 3 | 3 | 3 |
| zinc oxide | 2 | 2 | 2 | 2 | 2 | 2 | 2 |
| 6PPD | 1.5 | 1.5 | 1.5 | 1.5 | 1.5 | 1.5 | 1.5 |
| wax | 1 | 1 | 1 | 1 | 1 | 1 | 1 |
| aromatic oil | 12 | 12 | 12 | 12 | 12 | 12 | 12 |
| Poly(Bisphenol A-co-epichlorhydrin) glycidyl end-capped, MW = 380 | — | 2 | — | — | — | — | — |
| Poly(Bisphenol A-co-epichlorhydrin) glycidyl end-capped, MW = 6100 | — | — | 2 | — | — | — | — |
| Glycidylbutyrate | — | — | — | 2 | — | — | — |
| Penacolite ® CRL-411[a] | — | — | — | — | 2 | — | — |
| Ester diol[b] | — | — | — | — | — | 2 | — |
| Glycidylneodecanoate | — | — | — | — | — | — | 2 |
| Curing system: |  |  |  |  |  |  |  |
| sulfur | 1.2 | 1.2 | 1.2 | 1.2 | 1.2 | 1.2 | 1.2 |
| CBS | 1.8 | 1.8 | 1.8 | 1.8 | 1.8 | 1.8 | 1.8 |
| DPG80 | 1.25 | 1.25 | 1.25 | 1.25 | 1.25 | 1.25 | 1.25 |

[a]reaction product of resorcinol, formaldehyde and Bisphenol A diglycidylether polymer and styrene from Indspec Chemical Corp.
[b]reactive diluent EXXRD-85, i.e., benzoic acid, 4 hydroxy-3-{(1-oxoneodecyl)oxy}propyl ester (85% active) from Exxon Chemical

TABLE 8

Cure, Physical and Processing Properties

|  | SS16 | SS17 | SS18 | SS19 | SS20 | SS21 | SS22 |
|---|---|---|---|---|---|---|---|
| Cure characteristics (ASTM D2084) |  |  |  |  |  |  |  |
| $t_2$ (min.) | 6.8 | 6.7 | 7.0 | 6.8 | 7.0 | 6.7 | 6.9 |
| cure time (min.) | 65 | 55 | 46 | 38 | 53 | 40 | 50 |
| Tensile properties (ASTM D412) |  |  |  |  |  |  |  |
| Elongation at break (%) | 479.3 | 502.7 | 482.1 | 461.9 | 440.1 | 469.7 | 461.5 |
| Stress at break (MPa) | 19.37 | 18.33 | 17.00 | 19.16 | 17.45 | 17.96 | 19.02 |
| M100 (MPa) | 2.17 | 2.05 | 2.24 | 2.43 | 2.48 | 2.25 | 2.31 |
| M300 (MPa) | 8.92 | 8.34 | 8.56 | 10.49 | 10.07 | 9.42 | 10.24 |
| M300/M100 | 4.12 | 4.06 | 3.81 | 4.33 | 4.06 | 4.19 | 4.43 |
| Processability |  |  |  |  |  |  |  |
| Mooney peak (kPa) | 121.0 | 74.4 | 87.3 | 52.3 | 95.1 | 93.7 | 69.5 |
| processability index | 1.00 | 0.61 | 0.72 | 0.43 | 0.79 | 0.77 | 0.57 |

Processability was measured on non productive recipes, i.e., without the curing system. The curing system was added on a room-temperature two-roll mill for the evaluation of the curing characteristics.

Example 5

In this example, the compositions and their properties are shown in Table 9 and Table 10 respectively. SS23 is the control composition. It can be seen from Table 10, that the use of diethyleneglycol (SS24) (M. P. Wagner, Rubber Chemistry and Technology, 49, 703, 1976) and exo-2,3-epoxynorbornane (SS26) significantly reduces the cure time as well as the value of the processability index compared to the control composition. The use of glycidyl-4-methoxyphenylether (SS25) also reduces the value of the processability index compared to the control composition.

TABLE 9

| | Formulations | | | | |
|---|---|---|---|---|---|
| | SS23 | SS24 | SS25 | SS26 | SS27 |
| solution SBR | 100 | 100 | 100 | 100 | 100 |
| silica | 60 | 60 | 60 | 60 | 60 |
| X50S | 9.6 | 9.6 | 9.6 | 9.6 | 9.6 |
| stearic acid | 3 | 3 | 3 | 3 | 3 |
| zinc oxide | 2 | 2 | 2 | 2 | 2 |
| 6PPD | 1.5 | 1.5 | 1.5 | 1.5 | 1.5 |
| wax | 1 | 1 | 1 | 1 | 1 |
| aromatic oil | 12 | 12 | 12 | 12 | 12 |
| Diethyleneglycol* | — | 2 | — | — | — |
| Glycidyl-4-methoxyphenylether | — | — | 2 | — | — |
| exo-2,3-epoxynorbornane | — | — | — | 2 | — |
| Polypropyleneglycol diglycidylether | — | — | — | — | 2 |
| Curing system: | | | | | |
| sulfur | 1.2 | 1.2 | 1.2 | 1.2 | 1.2 |
| CBS | 1.8 | 1.8 | 1.8 | 1.8 | 1.8 |
| DPG80 | 1.25 | 1.25 | 1.25 | 1.25 | 1.25 |

*Cf., M. P. Wagner, Rubber Chemistry and Technology, 49, 703, 1976.

TABLE 10

| | Cure, Physical and Processing Properties | | | | |
|---|---|---|---|---|---|
| | SS23 | SS24 | SS25 | SS26 | SS27 |
| Cure characteristics (ASTM D2084) | | | | | |
| $t_2$ (min.) | 6.9 | 6.7 | 6.6 | 7.0 | 6.2 |
| cure time (min.) | 65 | 39 | 69 | 55 | 51 |
| Tensile properties (ASTM D412) | | | | | |
| Elongation at break (%) | 348.9 | 377.0 | 348.1 | 344.5 | 368.2 |
| Stress at break (MPa) | 18.21 | 19.48 | 18.48 | 17.37 | 19.06 |
| M100 (MPa) | 3.26 | 3.24 | 3.50 | 3.31 | 3.38 |
| M300 (MPa) | 14.79 | 14.30 | 15.20 | 14.48 | 14.69 |
| M300/M100 | 4.52 | 4.36 | 4.38 | 4.29 | 4.30 |
| Processability | | | | | |
| Mooney peak (kPa) | 103.0 | 49.4 | 70.5 | 81.4 | 64.7 |
| processability index | 1.00 | 0.48 | 0.68 | 0.79 | 0.63 |

Processability was measured on non productive recipes, i.e., without the curing system. The curing system was added on a room-temperature two-roll mill for the evaluation of the curing characteristics.

Example 6

In this example, the compositions and their properties are shown in Table 11 and Table 12 respectively. SS28 is the control composition. It can be seen from Table 12, that the use of poly(phenylglycidylether)-co-formaldehyde (SS31), poly(Bisphenol A-co-epichlorhydrin) glycidyl end-capped, MW=380 (SS32), poly(Bisphenol A-co-epichlorhydrin) glycidyl end-capped, MW=6100 (SS33) and polyethyleneglycol, MW=1000 (SS34) significantly reduce the cure time as well as the value of the processability index compared to the control composition. The use of 2-ethylhexylglycidylether (SS29) significantly reduces the value of the processability index compared to the control composition. It should be noted that the use of a lower molecular weight epoxy resin (SS32) provides better storage stability than a higher molecular weight epoxy resin (SS33). In addition, it is clear from Table 12, that low molecular weight epoxy compounds (SS29, SS30, SS31) are more effective than polyethyleneglycol (M. P. Wagner, Rubber Chemistry and Technology, 49, 703, 1976) (SS34) as far as slowing down the adverse rheological changes that occur during storage.

TABLE 11

| | Formulations | | | | | | |
|---|---|---|---|---|---|---|---|
| | SS28 | SS29 | SS30 | SS31 | SS32 | SS33 | SS34 |
| solution SBR | 100 | 100 | 100 | 100 | 100 | 100 | 100 |
| silica | 60 | 60 | 60 | 60 | 60 | 60 | 60 |
| X50S | 9.6 | 9.6 | 9.6 | 9.6 | 9.6 | 9.6 | 9.6 |
| stearic acid | 3 | 3 | 3 | 3 | 3 | 3 | 3 |
| zinc oxide | 2 | 2 | 2 | 2 | 2 | 2 | 2 |
| 6PPD | 1.5 | 1.5 | 1.5 | 1.5 | 1.5 | 1.5 | 1.5 |
| wax | 1 | 1 | 1 | 1 | 1 | 1 | 1 |
| aromatic oil | 12 | 12 | 12 | 12 | 12 | 12 | 12 |
| 2-ethylhexyl glycidylether | — | 2 | — | — | — | — | — |
| Polypropyleneglycol diglycidylether | — | — | 2 | — | — | — | — |
| Poly(phenyl-glycidylether)-co-formaldehyde | — | — | — | 2 | — | — | — |
| Poly(Bisphenol A-co-epichlorhydrin) glycidyl end-capped, MW = 380 | — | — | — | — | 2 | — | — |
| Poly(Bisphenol A-co-epichlorhydrin) glycidyl end-capped, MW = 6100 | — | — | — | — | — | 2 | — |
| Polyethyleneglycol,* MW = 1000 | — | — | — | — | — | — | 2 |
| Curing system: | | | | | | | |
| sulfur | 1.2 | 1.2 | 1.2 | 1.2 | 1.2 | 1.2 | 1.2 |
| CBS | 1.8 | 1.8 | 1.8 | 1.8 | 1.8 | 1.8 | 1.8 |
| DPG80 | 1.25 | 1.25 | 1.25 | 1.25 | 1.25 | 1.25 | 1.25 |

*Cf., M. P. Wagner, Rubber Chemistry and Technology Vol. 49, 703, 1976

TABLE 12

Cure, Physical and Processing Properties

|  | SS28 | SS29 | SS30 | SS31 | SS32 | SS33 | SS34 |
|---|---|---|---|---|---|---|---|
| Cure characteristics (ASTM D2084) | | | | | | | |
| $t_2$ (min.) | 6.8 | 7.4 | 7.5 | 7.2 | 7.5 | 7.5 | 6.8 |
| cure time (min.) | 60 | 60 | 60 | 60 | 60 | 60 | 60 |
| $t_{90}$ (min.) | 65 | 87 | 63 | 60 | 59 | 59 | 40 |
| Tensile properties (ASTM D412) | | | | | | | |
| Elongation at break (%) | 340.1 | 374.3 | 357.9 | 343.5 | 345.8 | 364.8 | 331.5 |
| Stress at break (MPa) | 17.16 | 17.32 | 18.55 | 17.17 | 18.10 | 18.81 | 17.90 |
| M100 (MPa) | 3.06 | 2.74 | 3.21 | 3.40 | 3.51 | 3.58 | 3.58 |
| M300 (MPa) | 14.26 | 12.64 | 14.70 | 14.47 | 15.10 | 14.68 | 15.71 |
| M300/M100 | 4.66 | 4.61 | 4.58 | 4.26 | 4.30 | 4.10 | 4.39 |
| Processability | | | | | | | |
| Mooney peak (kPa) | 107.0 | 53.6 | 48.9 | 56.1 | 74.4 | 87.3 | 67.4 |
| processability index | 1.00 | 0.50 | 0.46 | 0.52 | 0.70 | 0.82 | 0.63 |

Processability was measured on non productive recipes, i.e., without the curing system. The curing system was added on a room-temperature two-roll mill for the evaluation of the curing characteristics.

Example 7

In this example, the compositions and their properties are shown in Table 13 and Table 14 respectively. SS35 is the control composition for the silica-carbon black filled composition. SS38 is the control composition for the carbon black composition. Table 14 shows that the use of polypropyleneglycoldiglycidylether (SS37) in a rubber composition filled with both silica and carbon black reduces the cure time and improves the processability after storage.

TABLE 13

| | Formulations | | | | | |
|---|---|---|---|---|---|---|
| | SS35 | SS36 | SS37 | SS38 | SS39 | SS40 |
| solution SBR | 100 | 100 | 100 | 100 | 100 | 100 |
| Silica | 30 | 30 | 30 | — | — | — |
| carbon black | 30 | 30 | 30 | 60 | 60 | 60 |
| X50S | 4.8 | 4.8 | 4.8 | — | — | — |
| stearic acid | 3 | 3 | 3 | 3 | 3 | 3 |
| zinc oxide | 2 | 2 | 2 | 2 | 2 | 2 |
| 6PPD | 1.5 | 1.5 | 1.5 | 1.5 | 1.5 | 1.5 |
| Wax | 1 | 1 | 1 | 1 | 1 | 1 |
| aromatic oil | 11 | 11 | 11 | 10 | 10 | 10 |
| 2-ethylhexyl-glycidylether | — | 2 | — | — | 2 | — |
| Polypropyleneglycol diglycidylether | — | — | 2 | — | — | 2 |
| Curing system: | | | | | | |
| Sulfur | 1.2 | 1.2 | 1.2 | 1.2 | 1.2 | 1.2 |
| CBS | 1.8 | 1.8 | 1.8 | 1.8 | 1.8 | 1.8 |
| DPG80 | 1.25 | 1.25 | 1.25 | 1.25 | 1.25 | 1.25 |

TABLE 14

Cure, Physical and Processing Properties

| | SS35 | SS36 | SS37 | SS38 | SS39 | SS40 |
|---|---|---|---|---|---|---|
| Cure characteristics (ASTM D2084) | | | | | | |
| $t_2$ (min.) | 4.0 | 4.5 | 4.2 | 3.9 | 4.5 | 4.0 |
| cure time (min.) | 65 | 120 | 63 | 45 | 45 | 45 |
| $t_{90}$ (min.) | 60 | 115 | 58 | 45 | 180 | 150 |
| Tensile properties (ASTM D412) | | | | | | |
| Elongation at break (%) | 365.01 | 320.96 | 357.02 | 362.38 | 477.41 | 446.68 |
| Stress at break (MPa) | 20.70 | 18.94 | 19.83 | 16.76 | 13.20 | 15.77 |
| M100 (MPa) | 3.98 | 3.88 | 3.89 | 3.58 | 2.35 | 2.82 |
| M300 (MPa) | 16.94 | 17.58 | 16.56 | 14.02 | 8.29 | 10.69 |
| M300/M100 | 4.26 | 4.53 | 4.26 | 3.91 | 3.53 | 3.79 |
| Processability | | | | | | |
| Mooney peak (kPa) | 95.1 | 73.4 | 73.3 | 35.2 | 31.7 | 33.1 |
| processability index | 1.00 | 0.77 | 0.77 | 1.00 | 0.90 | 0.94 |

Processability was measured on non productive recipes, i.e., without the curing system. The curing system was added on a room-temperature two-roll mill for the evaluation of the curing characteristics.

Example 8

This example shows the compositions and their properties in Table 9 and Table 15 respectively, and the effect of the curing system (CBS, DPG80, sulfur) on the processability, evaluated in conjunction with an epoxy additive, i.e., polypropyleneglycoldiglycidylether. Table 15 shows that the curing system somewhat improves the processability after storage of a silica-filled rubber composition (compare SS23 (non productive) and SS24 (productive)). It is also seen that the use of epoxy additives, i.e., in this case, polypropyleneglycoldiglycidylether, in conjunction with the curing system, further improves the processability after storage (compare SS23 (productive) and SS27 (productive)). These examples show that the results obtained for the previous examples relative to non-productive silica-filled rubber composition are also valid for silica-filled rubber compositions containing curatives (productive).

TABLE 15

Processing Properties

|  | SS23 (non-productive) | SS23 (productive) | SS27 (non-productive) | SS27 (productive) |
|---|---|---|---|---|
| Processability |  |  |  |  |
| Mooney peak (kPa) | 117.0 | 103.0 | 82.2 | 75.8 |
| processability index | 1.00 | 0.88 | 0.70 | 0.65 |

The effect of the curing system (CBS, DPG80, sulfur) on processability was evaluated. In this particular case, processability was measured after a storage period of 31 days at 40° C. The storage temperature was lowered compared to the usual test described previously in order to prevent a premature curing of the compositions.

Example 9

Figure 2:
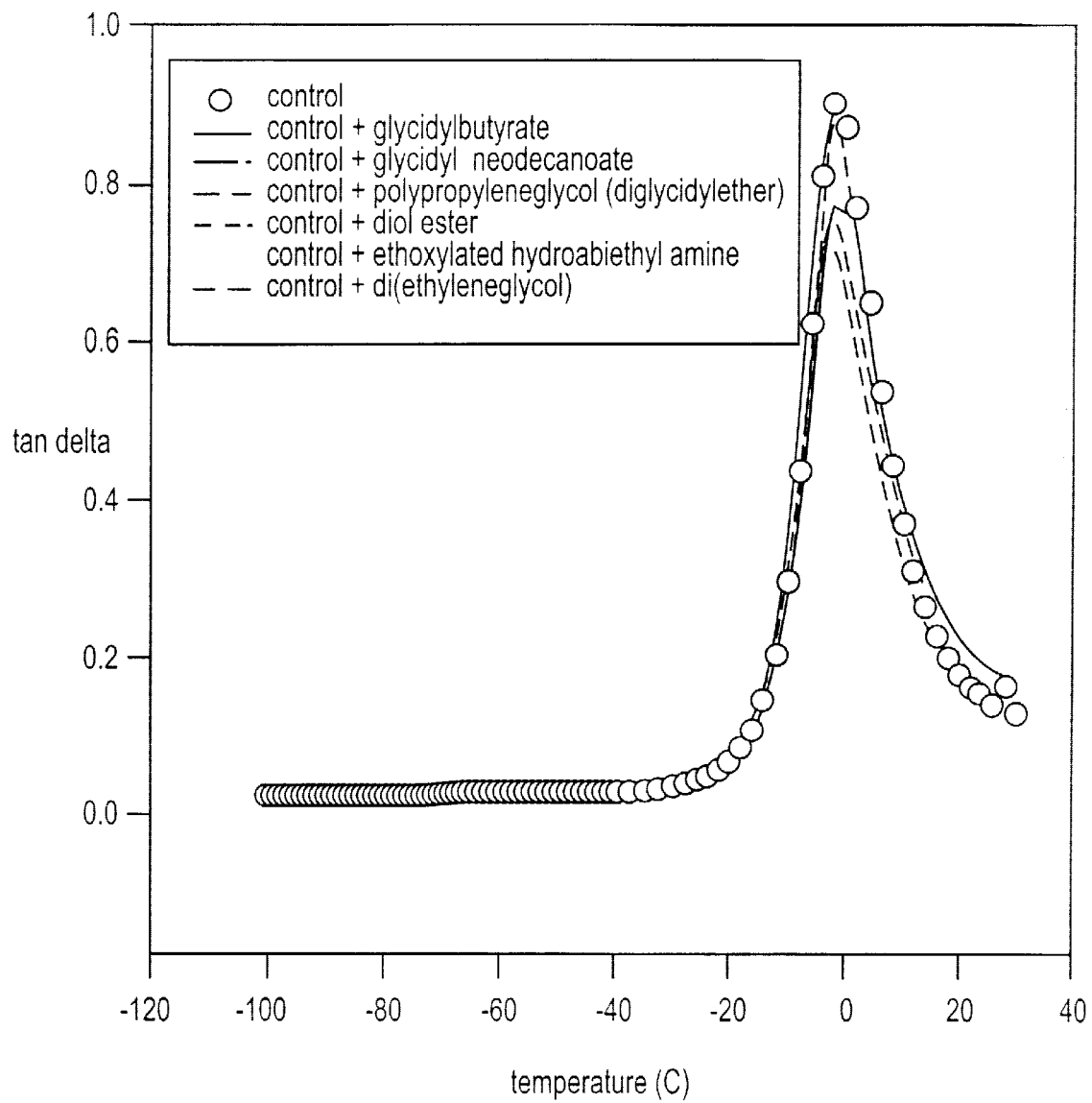
FIG. 2 shows the effect of additives on Tan δ measured at 1 Hz and 0.1% strain as a function of temperature for silica-filled rubber vulcanizates employing the organic compounds of the present invention.
Figure 3:
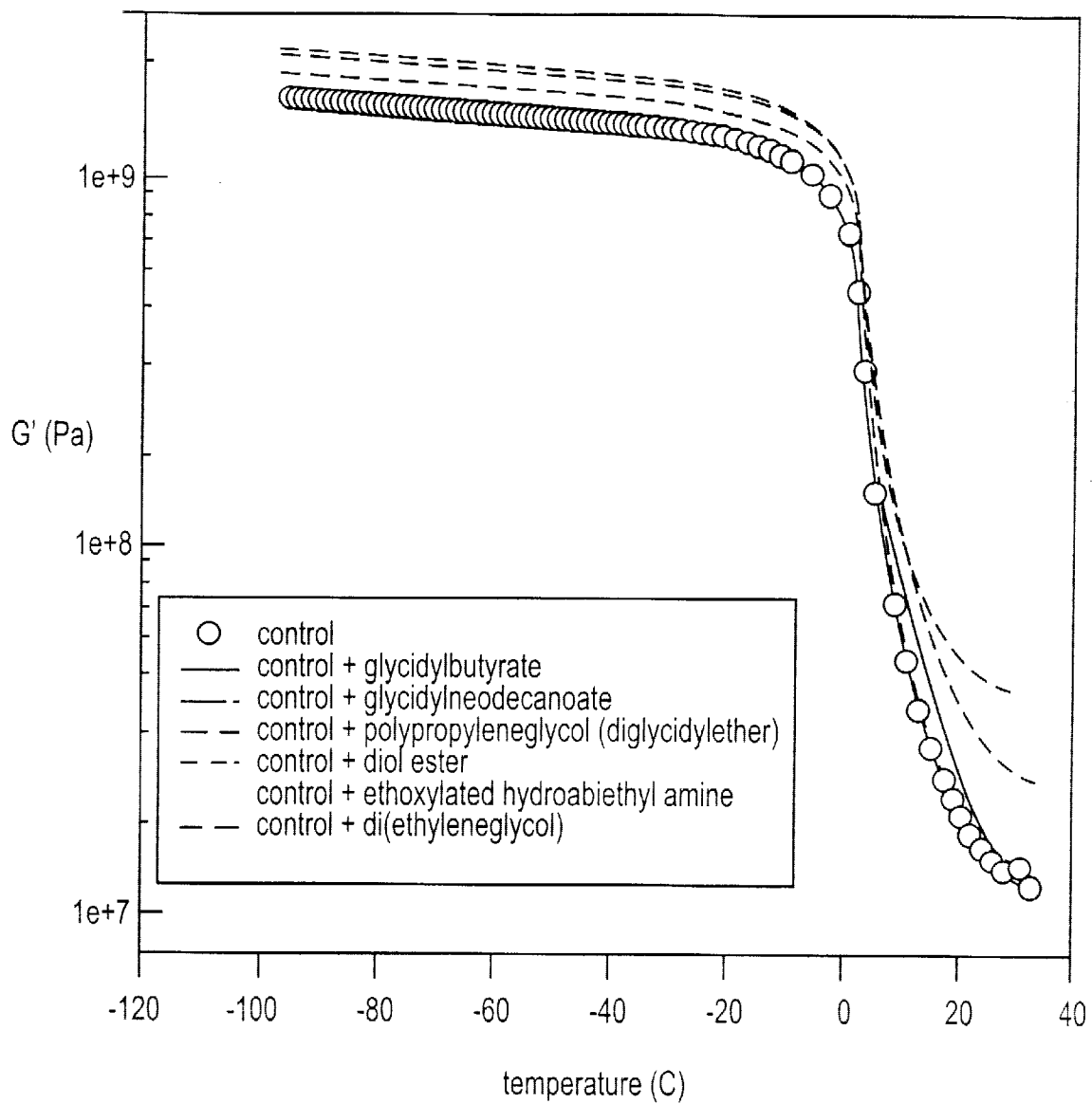
FIG. 3 is a graph showing the effect of additives on G' measured at 1 Hz and 0.1% strain as a function of temperature for silica-filled rubber vulcanizates employing the organic compounds of the present invention.

This example deals with the effects of additives on the dynamic mechanical properties of silica-filled rubber vulcanizates. It was seen in the preceding examples that the use of certain epoxy compounds in silica-filled rubber compositions both improve their processability after storage and reduces their cure time. FIG. 2 shows the effect of additives on tan δ measured at 1 Hz and 0.1% strain as a function of temperature for silica-filled rubber vulcanizates. FIG. 3 shows the effect of additives on G' measured at 1 Hz and 0.1% strain as a function of temperature for silica-filled rubber vulcanizates. No major differences are observed between the viscoelastic properties of the different vulcanizates tested. The presence of these additives does not significantly affect the dynamic mechanical properties of silica-filled rubber vulcanizates, while improving their processability (after storage), as well as in some cases, their cure rates.

Example 10

A silica reinforced rubber composition was used for the evaluation of the effect of epoxy-containing compositions on the cure characteristics and the tensile properties of the vulcanizate as well as on the processability of the uncured compositions. Table 16 gives the compositions. The properties mentioned above are reported in Table 17. SS41 represents the control composition. The Mooney peak and the processability index of SS42 are much lower than that of SS41. This indicates that the addition of isopropylglycidylether to the control composition leads to a significant improvement of the resistance to adverse rheological changes that occur during storage, whereas the cyclo epoxy, where the epoxy group is located on a cyclohexyl ring is not effective in improving processability. Note that the values of the Mooney Peak are much higher in this example than in the previous examples. This is due to the fact that a different batch of SSBR (of higher polydispersity) was used for the experiments conducted in the present example. The dump temperature was 10° C. higher for these experiments compared to the previous examples. However, the batch-to-batch variations are negligible when considering the processability index of compositions made at a constant dump temperature.

TABLE 16

Formulations

|  | SS41 | SS42 | SS43 |
|---|---|---|---|
| solution SBR | 100 | 100 | 100 |
| silica | 60 | 60 | 60 |
| X50S | 9.6 | 9.6 | 9.6 |
| stearic acid | 3 | 3 | 3 |
| zinc oxide | 2 | 2 | 2 |
| 6PPD | 1.5 | 1.5 | 1.5 |
| wax | 1 | 1 | 1 |
| aromatic oil | 12 | 12 | 12 |
| Isopropylglycidylether | — | 2 | — |
| Cycloepoxy[c] | — | — | 2 |
| Curing system: |  |  |  |
| sulfur | 1.2 | 1.2 | 1.2 |
| CBS | 1.8 | 1.8 | 1.8 |
| DPG80 | 1.25 | 1.25 | 1.25 |

[c]3,4-epoxycyclohexylmethyl-3,4-epoxycyclohexanecarboxylate

TABLE 17

Cure, Physical and Processing Properties

|  | SS41 | SS42 | SS43 |
|---|---|---|---|
| Cure characteristics (ASTM D2084) |  |  |  |
| $t_2$ (min.) | 6.8 | 6.2 | 5.7 |
| cure time (min.) | 65 | 72 | 45 |
| Tensile properties (ASTM D412) |  |  |  |
| Elongation at break (%) | 351.4 | 340.5 | 368.8 |
| Stress at break (MPa) | 19.30 | 17.63 | 20.30 |
| M100(MPa) | 2.97 | 3.09 | 3.33 |
| M300(MPa) | 14.66 | 14.75 | 15.66 |
| M300/M100 | 4.98 | 4.77 | 4.70 |
| Processability |  |  |  |
| Mooney peak (kPa) | 169.0 | 140.3 | 172.4 |
| processability index | 1.00 | 0.83 | 1.02 |

Processability was measured on non productive recipes, i.e., without the curing system. The curing system was added on a room-temperature two-roll mill for the evaluation of the curing characteristics.

As noted in the specification, the invention involves combining various organic compounds with a rubber compound or rubber composition which includes not only the physical mixing of the various compounds or compositions which, for the most part comprise solid materials at room temperature and elevated temperatures (<300° C.) that occur during mixing, but also mixing the various organic compounds and rubber compounds or compositions where one or both are in the liquid phase. This liquid phase includes, not only melted organic compounds and viscous fluid rubber compounds or compositions at elevated temperatures, but also fluid dispersions of the organic compounds and/or the rubber compounds or compositions.

The rubber compounds comprise the various rubbers set forth in the specification whereas the rubber compositions comprise these rubbers in combination with fillers, primarily silica and the other fillers noted herein and rubber additives also noted herein. In some instances, the supplier of the rubber compound will add conventional rubber additives to the rubber. In any event, the process of the invention involves combining a mixture comprising rubber, silica and at least one of the aforementioned low molecular weight organic compounds by which it is meant that either the rubber or the rubber in combination with silica and in some instances other fillers and additives are combined with the low molecular weight organic compound. Combining the organic compounds with the rubber compound or rubber composition and/or silica involves mixing the solid and/or liquid phase materials in a high shear mixer such as a Banbury mixer, Intermesh mixer, Extruder mixer, Sigma blade mixer, 2-roll rubber mill and similar apparatus known in the rubber compounding art.

During the combination or mixing of the organic compounds with the rubber compound or composition, chemical reactions can occur between the various components such as reactions of the organic compounds with hydroxyl or other reactive groups on the surface of the silica or other filler in the rubber composition, or the reaction of the crosslinking or curing system with the rubber compound or composition, and in some instances with the organic compounds during the curing of the mixture as described herein. Accordingly, the invention comprises not only the process of combining the various organic compounds with the rubber compound or composition and other components, but also the product obtained by the process at all stages of the process, whether the composition made according to the process of the invention includes or excludes a curing system, and whether or not the product made by the process of the invention is subsequently subjected to a curing reaction with a crosslinking or curing system.

The various numerical ranges describing the invention, as set forth in the specification, also include any combination of the lower ends of the ranges with the higher ends of the ranges including, inter alia, ranges of concentrations of compounds or compositions, ratios of these compounds or compositions to one another, molecular weights, ratios of monomer units or polymer blocks to one another, average number of polymer blocks in the in the polymer compounds of the invention, whole number and/or fractional number values encompassed by these ranges, as well as ranges encompassed within these ranges.

The specification also refers to using at least one compound or composition, by which it is intended that either a single compound or composition or various combinations of the compound or composition are included. Additionally, the specification refers to combinations of compounds or compositions. In either event, the preferred combination of compounds or compositions includes the two component, three component or four component combinations.

The specification sets forth various references to describe not only the prior art, but also various features of the invention. All of these references are incorporated herein in their entirety.

It will be apparent to those skilled in the art that modifications and variations can be made in the novel composition of matter and process and product produced by the process as described herein without departing from the spirit or scope of the invention. It is intended that these modifications and variations and their equivalents are to be included as part of this invention, provided they come within the scope of the appended claims.

What is claimed is:

1. A product having improved processability, storage stability and/or cure rate which is an uncured silica reinforced rubber composition where silica comprises the major filler in said reinforced rubber composition, said product produced by the process comprising combining a mixture comprising rubber, silica and at least one organic compound of relatively low molecular weight comprising, an abietyl compound, or an ester hydroxyl organic compound containing at least one hydroxyl group, at least one ester group, and optionally an ether group, where the molecular weight of said organic compound of relatively low molecular weight is less than about 7,000, wherein said organic compound is ethoxylated dehydroabietylamine comprising 5 moles of ethylene oxide in admixture with dehydroabietylamine, ethoxylated dehydroabietylamine comprising 11 moles of ethylene oxide in admixture with dehydroabietylamine, or an ester diol and combinations thereof optionally containing a rubber cross-linking system or curing system.

2. The product of claim 1 wherein said ester diol is benzoic acid, 4-hydroxy-3-{(1-oxoneodecyl )oxy}propyl ester.

3. A product having improved processability, storage stability and/or cure rate of an uncured silica reinforced rubber composition where silica comprises the major filler in said reinforced rubber composition, comprising a mixture comprising rubber, silica and at least one organic compound comprising an organic compound of relatively low molecular weight that contains at least one functional group, wherein said functional group is at least an epoxy functional group located in terminal or sterically unhindered positions in the molecule of said organic compound, where the molecular weight of said organic compound of relatively low molecular weight is less than about 7,000 wherein the organic compound is N,N-diglycidylaniline, N,N-diglycidyl-4-glycidyl oxyaniline, 3,4-epoxycyclohexylmethyl-3,4-epoxycyclohexanecarboxylate, diglycidyl-1,2-cyclohexane dicarboxylate, 2,3-epoxypropyl benzene, exo-2,3-epoxynorbornane, poly(bisphenol A-co-epichlorohydrin) end capped, glycidyl 4-methyoxy phenyl ether, poly (phenylglycidyl ether)-co-formaldehyde, cresyl glycidyl ether, diglycidyl ether of 1,4-butanediol, dimer acid diglycidyl ester, 1,2-epoxy-9-decene, N-(2,3-epoxypropyl) phthalimide, glycidyl butyrate, glycidyl neodecanoate, and combinations thereof.

4. A product having improved processability, storage stability and/or cure rate which is an uncured silica reinforced rubber composition where silica comprises the major filler in said reinforced rubber composition, said product produced by the process comprising combining a mixture comprising rubber, silica and at least one organic compound comprising an organic compound of relatively low molecular weight that contains at least one functional group, wherein said functional group is at least an epoxy functional group located in terminal or sterically unhindered positions in the molecule of said organic compound, where the molecular weight of said organic compound of relatively low molecular weight is less than about 7,000 wherein the organic compound is N,N-diglycidylaniline, N,N-diglycidyl-4-glycidyl oxyaniline, ethoxylated dehydroabietylamine comprising 5 moles ethylene oxide in admixture with dehydroabietylamine, ethoxylated dehydroabietylamine comprising 11 moles ethylene oxide in admixture with dehydroabietylamine, or benzoic acid, 4 hydroxy-3-{ (1-oxoneodecyl)oxy}propyl ester and combinations thereof.

5. A product having improved processability, and reduced cure time which is an uncured silica reinforced rubber composition where silica comprises the major filler in said reinforced rubber composition, said product produced by the process comprising combining a mixture comprising rubber, silica and at least one organic compound comprising an organic compound of relatively low molecular weight that contains at least one functional group, wherein said functional group is at least an epoxy functional group located in terminal or sterically unhindered positions in the molecule of said organic compound, or said organic compound comprises an abietyl compound, or an ester hydroxyl organic compound containing at least one hydroxyl group, at least one ester group, and optionally an ether group, where the molecular weight of said organic compound of relatively low molecular weight is less than about 7,000 wherein said organic compound is N,N-diglycidyl aniline, N,N-diglycidyl-4-glycidyl oxyaniline, diglycidyl-1,2-cyclohexane dicarboxylate, exo-2,3-epoxynorbornane, poly (bisphenol A-co-epichlorohydrin) end capped, glycidyl butyrate, glycidyl neodecanoate, poly(phenylglycidylether)- co-formaldehyde, 3,4-epoxy cyclohexylmethyl-3,4-epoxycyclohexanecarboxylate, ethoxylated dehydroabietylamine comprising 5 moles of ethylene oxide in admixture with dehydroabietylamine, ethoxylated dehydroabietylamine comprising 11 moles of ethylene oxide in admixture with dehydroabietylamine, or benzoic acid, 4 hydroxy-3-{(1-oxoneodecyl)oxy}propyl ester.

6. A product according to one of claims 1–5 wherein said rubber is natural rubber, epoxidized natural rubber, methacrylated natural rubber, synthetic polyisoprene, polybutadiene, styrene butadiene copolymers, styrene/isoprene/butadiene copolymers, para or ortho methylstyrene/butadiene rubbers, isoprene/butadiene copolymers, para or ortho methyl styrene/butadiene/isoprene terpolymers, ethylene/propylene/diene rubbers, butyl rubber, isobutylene-isoprene copolymer and its halogenated derivatives, brominated para-methyl styrene isobutylene rubber, butadiene/styrene/acrylonitrile terpolymers, isoprene/styrene/acrylonitrile terpolymers, butadiene/acrylonitrile copolymers, isoprene/acrylonitrile copolymers, butadiene/isoprene/acrylonitrile terpolymers, butadiene-alkyl acrylate or methacrylate copolymers, styrene/butadiene/alkyl acrylate or alkyl methacrylate rubbers, modified styrene/butadiene or butadiene rubbers with silica or carbon black reactive functional groups, and combinations of the aforementioned rubbers with each other and/or with natural rubber and combinations thereof.

7. A product according to one of claims 1-5 wherein said organic compound is present in an amount from about 0.1 to about 30 phr, and said silica is present in an amount greater than about 15 phr.

8. A product according to one of claims 1–5 wherein said silica is precipitated silica or pyrogenic silica or combinations thereof and said mixture contains secondary fillers in lesser amounts than said silica, wherein said secondary fillers are carbon black, clay, mica, talc, inorganic silicates, bentonite, titanium dioxide, aramid pulp, short vegetable fibers, short synthetic polymer fibers, starch, calcium carbonate, or calcium sulfate or combinations thereof, and said organic compounds are present in an amount from about 0.1 to about 30 phr.

9. A product according to claim 6 wherein said organic compound is present in an amount from about 0.1 to about 30 phr, and said silica is present in an amount greater than about 15 phr.

10. A product according to claim 6 wherein said silica is precipitated silica or pyrogenic silica or combinations thereof and said mixture contains secondary fillers in lesser amounts than said silica, wherein said secondary fillers are carbon black, clay, mica, talc, inorganic silicates, bentonite, titanium dioxide, aramid pulp, short vegetable fibers, short synthetic polymer fibers, starch, calcium carbonate, or calcium sulfate or combinations thereof, and said organic compounds are present in an amount from about 0.1 to about 30 phr.

11. An article of manufacture comprising a tire made from the product of claim 6 optionally cured with a rubber crosslinking system or curing system and optionally containing processing aids, aromatic oils, napthenic oils, paraffin oils, rosin oils, antioxidants, antiozonants, waxes, fillers, resins, adhesion promoters, silica coupling systems, crosslinking systems or curing systems and combinations thereof.

12. An article of manufacture comprising tire elastomeric components made from the product of claim 6, wherein said tire component is a tire carcass, tread cushion overlay, sidewall, innerliner, bead filler, liner cushion, wing tip, or bead or bead area compound, optionally cured with a rubber crosslinking system or curing system and optionally containing processing aids, aromatic oils, napthenic oils, paraffin oils, rosin oils, antioxidants, antiozonants, waxes, fillers, resins, adhesion promoters, silica coupling systems, crosslinking systems or curing systems and combinations thereof.

13. An article of manufacture comprising a curing bladder made from the product of claim 6, optionally cured with rubber crosslinking system or curing system and optionally containing processing aids, aromatic oils, napthenic oils, paraffin oils, rosin oils, antioxidants, antiozonants, waxes, fillers, resins, adhesion promoters, silica coupling systems, crosslinking systems or curing systems and combinations thereof.

14. An article of manufacture according to claim 12 made from butyl rubber or brominated paramethyl styrene isobutylene rubber.

* * * * *